(12) United States Patent
Yamamoto et al.

(10) Patent No.: US 8,952,972 B2
(45) Date of Patent: Feb. 10, 2015

(54) INFORMATION PROCESSING APPARATUS, INFORMATION PROCESSING METHOD AND STORAGE MEDIUM

(75) Inventors: Keiichi Yamamoto, Yokohama (JP); Eri Kanai, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 161 days.

(21) Appl. No.: 13/237,567

(22) Filed: Sep. 20, 2011

(65) Prior Publication Data
US 2012/0092355 A1 Apr. 19, 2012

(30) Foreign Application Priority Data

Oct. 15, 2010 (JP) ................................. 2010-232781
May 30, 2011 (JP) ................................. 2011-120991

(51) Int. Cl.
*G06T 1/00* (2006.01)
*G06T 15/00* (2011.01)
*G06F 3/00* (2006.01)
*G06F 3/0488* (2013.01)

(52) U.S. Cl.
CPC ................................. *G06F 3/04883* (2013.01)
USPC .......................................... 345/522; 715/700

(58) Field of Classification Search
None
See application file for complete search history.

(56) References Cited

U.S. PATENT DOCUMENTS

| 2004/0056848 | A1* | 3/2004 | Sasaki ........................... 345/173 |
| 2004/0207606 | A1 | 10/2004 | Atwood et al. |
| 2006/0267956 | A1* | 11/2006 | Pihlaja .......................... 345/173 |
| 2007/0252841 | A1* | 11/2007 | Kim ............................... 345/522 |
| 2009/0128618 | A1* | 5/2009 | Fahn et al. ....................... 348/39 |
| 2009/0189915 | A1* | 7/2009 | Mercer et al. .................. 345/646 |
| 2010/0092032 | A1* | 4/2010 | Boca .............................. 382/103 |
| 2010/0245274 | A1* | 9/2010 | Fukuda .......................... 345/173 |
| 2010/0277429 | A1* | 11/2010 | Day et al. ...................... 345/173 |
| 2010/0283758 | A1* | 11/2010 | Homma et al. ............... 345/174 |
| 2010/0289768 | A1* | 11/2010 | Nakao ........................... 345/173 |
| 2010/0321303 | A1* | 12/2010 | Kwok et al. ................... 345/173 |
| 2011/0012856 | A1* | 1/2011 | Maxwell et al. .............. 345/173 |
| 2011/0037720 | A1* | 2/2011 | Hirukawa et al. ............. 345/173 |

(Continued)

FOREIGN PATENT DOCUMENTS

| CN | 1815507 A | 8/2006 |
| JP | 2004-140811 A | 5/2004 |

(Continued)

OTHER PUBLICATIONS

Chinese Office Action dated Dec. 2, 2013, corresponding to Chinese Patent Application No. 201110308392.4.

*Primary Examiner* — Joni Richer
*Assistant Examiner* — Yi Wang
(74) *Attorney, Agent, or Firm* — Fitzpatrick, Cella, Harper & Scinto

(57) ABSTRACT

An information processing apparatus which accepts one of a plurality of processes of different types in accordance with an operation instruction issued on a display screen, comprising: an input unit adapted to input the operation instruction issued on the display screen; an extraction unit adapted to extract an object of interest out of objects displayed on the display screen based on a position where the operation instruction has been input on the display screen; an obtaining unit adapted to obtain information indicating a display size of the object of interest extracted by the extraction unit; and a determination unit adapted to determine executable processing out of the processes of different types in accordance with the display size.

23 Claims, 18 Drawing Sheets

(56) References Cited

U.S. PATENT DOCUMENTS

2011/0043472 A1* 2/2011 Hada .............................. 345/173
2012/0081375 A1* 4/2012 Robert et al. ................. 345/522

FOREIGN PATENT DOCUMENTS

| JP | 2004213312 A | * | 7/2004 |
| JP | 2009-032028 A | | 12/2009 |

* cited by examiner

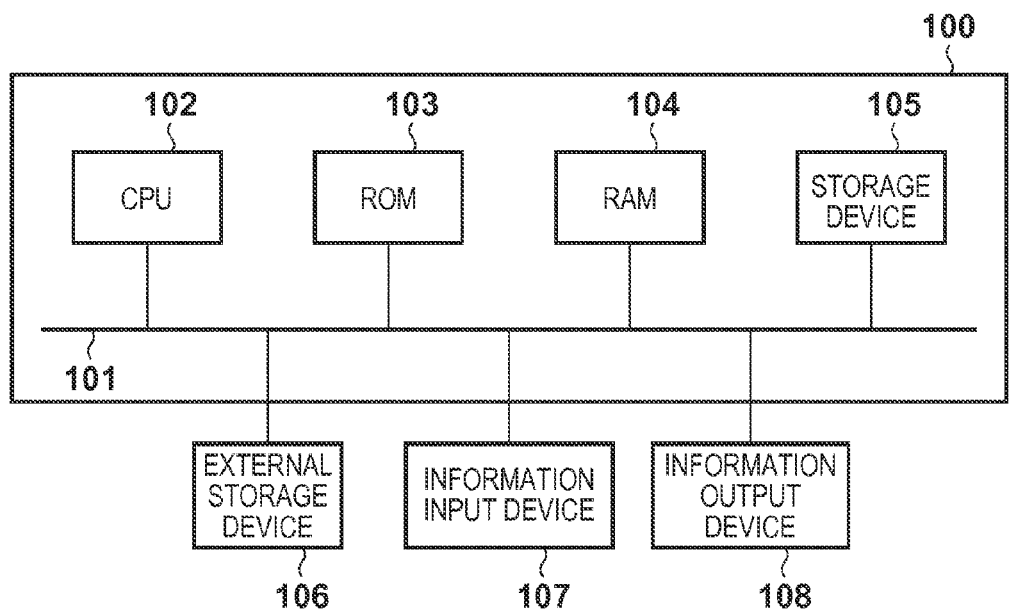
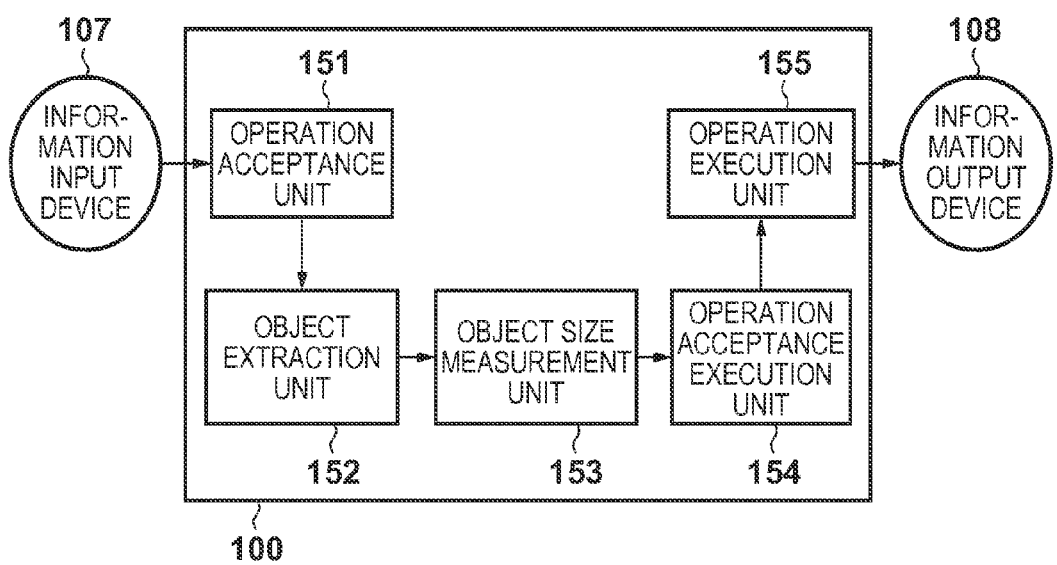

FIG. 4

| OBJECT (401) | SIZE (PIXEL COUNT) (402) | PERMITTED OPERATION (403) |
|---|---|---|
| TEXT BOX | SIZE AT WHICH FINGERTIP CANNOT FIT : LESS THAN 30×30 | ·SCROLL |
| | SIZE AT WHICH FINGERTIP CAN FIT : 30×30 OR MORE AND LESS THAN 100×100 | ·SELECTION (·SCROLL) |
| | SIZE AT WHICH HANDWRITING IS POSSIBLE : 100×100 OR MORE | ·HANDWRITTEN CHARACTER INPUT (·SELECTION) |
| IMAGE | SIZE AT WHICH CONTENTS CANNOT BE CONFIRMED : LESS THAN 50×50 | ·SCROLL |
| | SIZE AT WHICH CONTENTS CAN BE CONFIRMED : 50×50 OR MORE AND LESS THAN 100×100 | ·SELECTION (·SCROLL) |
| | SIZE AT WHICH HANDWRITING IS POSSIBLE : 100×100 OR MORE | ·SCRIBBLE (·SELECTION) |
| LIST BOX | SIZE AT WHICH BALL OF FINGER CANNOT FIT : LESS THAN 40×40 | ·SCROLL |
| | SIZE AT WHICH BALL OF FINGER CAN FIT : 40×40 OR MORE | ·SELECTION (·SCROLL) |
| BUTTON | SIZE AT WHICH CONTENTS CANNOT BE CONFIRMED : LESS THAN 40×40 | ·SCROLL |
| | SIZE AT WHICH CONTENTS CAN BE CONFIRMED : 40×40 OR MORE | ·SELECTION (·SCROLL) |
| LINK | SIZE AT WHICH CHARACTER CANNOT BE READ : LESS THAN 30×30 | ·SCROLL |
| | SIZE AT WHICH CHARACTER CAN BE READ : 30×30 OR MORE | ·SELECTION (·SCROLL) |

FIG. 6A

| OPERATION (601) | PRIORITY (602) |
|---|---|
| SELECTION | 1 |
| SCROLL | 2 |
| HANDWRITTEN CHARACTER INPUT | 3 |
| SCRIBBLE | 4 |

FIG. 6B

| OBJECT (611) | SIZE (PIXEL COUNT) (612) | OPERATION (613) | PRIORITY (614) |
|---|---|---|---|
| TEXT BOX | SIZE AT WHICH FINGERTIP CANNOT FIT : LESS THAN 30×30 | SCROLL | 1 |
| | | SELECTION | 2 |
| | SIZE AT WHICH FINGERTIP CAN FIT : 30×30 OR MORE AND LESS THAN 100×100 | SELECTION | 1 |
| | | SCROLL | 2 |
| | SIZE AT WHICH HANDWRITING IS POSSIBLE : 100×100 OR MORE | HANDWRITTEN CHARACTER INPUT | 1 |
| | | SELECTION | 2 |
| IMAGE | SIZE AT WHICH CONTENTS CANNOT BE CONFIRMED : LESS THAN 50×50 | SCROLL | 1 |
| | | SELECTION | 2 |
| | SIZE AT WHICH CONTENTS CAN BE CONFIRMED : 50×50 OR MORE AND LESS THAN 100×100 | SELECTION | 1 |
| | | SCROLL | 2 |
| | SIZE AT WHICH HANDWRITING IS POSSIBLE : 100×100 OR MORE | SCRIBBLE | 1 |
| | | SELECTION | 2 |
| LIST BOX | SIZE AT WHICH BALL OF FINGER CANNOT FIT : LESS THAN 40×40 | SCROLL | 1 |
| | | SELECTION | 2 |
| | SIZE AT WHICH BALL OF FINGER CAN FIT : 40×40 OR MORE | SELECTION | 1 |
| | | SCROLL | 2 |
| BUTTON | SIZE AT WHICH CONTENTS CANNOT BE CONFIRMED : LESS THAN 40×40 | SCROLL | 1 |
| | | SELECTION | 2 |
| | SIZE AT WHICH CONTENTS CAN BE CONFIRMED : 40×40 OR MORE | SELECTION | 1 |
| | | SCROLL | 2 |
| LINK | SIZE AT WHICH CHARACTER CANNOT BE READ : LESS THAN 30×30 | SCROLL | 1 |
| | | SELECTION | 2 |
| | SIZE AT WHICH CHARACTER CAN BE READ : 30×30 OR MORE | SELECTION | 1 |
| | | SCROLL | 2 |

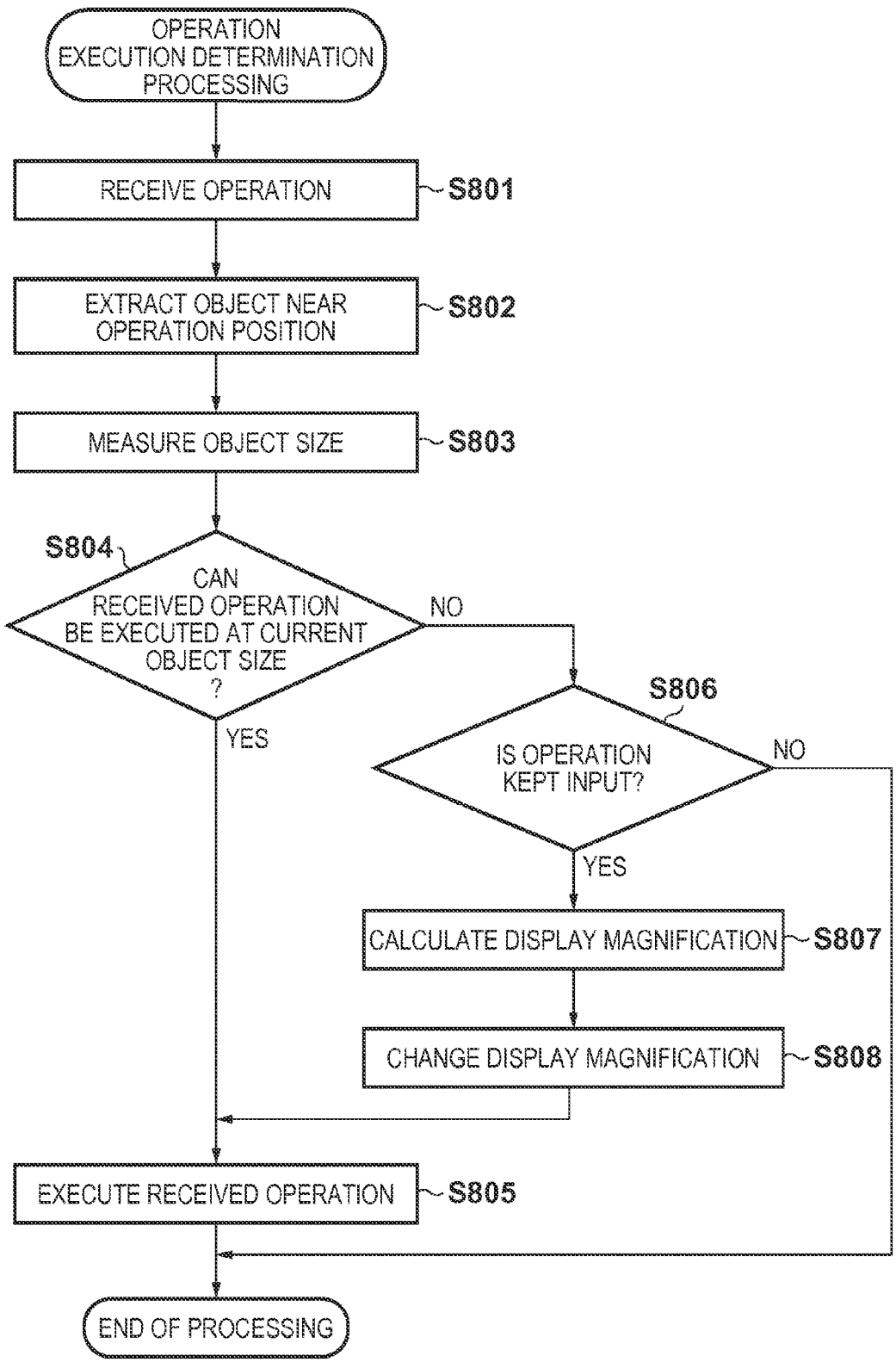

FIG. 10

| OBJECT 1001 | SIZE (PIXEL COUNT) 1002 | PERMITTED GESTURE 1003 |
|---|---|---|
| IMAGE | LESS THAN 200×200 | ·NO PERMITTED GESTURE |
| | 200×200 OR MORE AND LESS THAN 300×300 | ·○, △, □ |
| | 300×300 OR MORE AND LESS THAN 500×500 | ·○, △, □, ☆, ♪, G CLEF |
| | 500×500 OR MORE | ·○, △, □, ☆, ♪, G CLEF, CONFIDENTIAL, SPECIAL, Co., Ltd. |
| INTRA-IMAGE OBJECT | LESS THAN 30×30 | ·NO PERMITTED GESTURE |
| | 30×30 OR MORE AND LESS THAN 50×50 | ·○, △, □ |
| | 50×50 OR MORE AND LESS THAN 100×100 | ·○, △, □, ☆, ♪, G CLEF |
| | 100×100 OR MORE | ·○, △, □, ☆, ♪, G CLEF, CONFIDENTIAL, SPECIAL, Co., Ltd. |

FIG. 12

| CONDITION | | PRIORITY | PERMITTED OPERATION |
|---|---|---|---|
| OBJECT (1201) | SIZE (PIXEL COUNT) (1202) | (1203) | (1204) |
| IMAGE | SIZE AT WHICH CONTENTS CANNOT BE CONFIRMED : LESS THAN 50×50 | 4 | ·SCROLL |
| | SIZE AT WHICH CONTENTS CAN BE CONFIRMED : 50×50 OR MORE AND LESS THAN 100×100 | 3 | ·SCROLL<br>·IMAGE SELECTION |
| | SIZE AT WHICH HANDWRITING IS POSSIBLE : 100×100 OR MORE | 1 | ·IMAGE SELECTION<br>·SCRIBBLE<br>·CHARACTER INPUT |
| IMAGE | SIZE AT WHICH CONTENTS CAN BE CONFIRMED : 50×50 OR MORE | 2 | ·IMAGE SELECTION<br>·LAYOUT OPERATION |
| PAGE | SIZE AT WHICH FINE ADJUSTMENT IS POSSIBLE : 100×100 OR MORE | | |

FIG. 16A

| OBJECT | SIZE | | PERMITTED OPERATION |
|---|---|---|---|
| TEXT BOX ▼ | — × — OR MORE AND LESS THAN | 30 × 30 | SCROLL ▼ |
| TEXT BOX ▼ | 30 × 30 OR MORE AND LESS THAN | 100 × 100 | SELECTION ▼ |
| TEXT BOX ▼ | 100 × 100 OR MORE AND LESS THAN | — × — | HANDWRITTEN CHARACTER INPUT ▼ |
| IMAGE ▼ | — × — OR MORE AND LESS THAN | 50 × 50 | SCROLL ▼ |
| IMAGE ▼ | 50 × 50 OR MORE AND LESS THAN | 100 × 100 | SELECTION ▼ |
| IMAGE ▼ | 100 × 100 OR MORE AND LESS THAN | — × — | SCRIBBLE ▼ |
| LIST BOX ▼ | — × — OR MORE AND LESS THAN | 40 × 40 | SCROLL ▼ |
| LIST BOX ▼ | 40 × 40 OR MORE AND LESS THAN | — × — | SELECTION ▼ |
| BUTTON ▼ | — × — OR MORE AND LESS THAN | 40 × 40 | SCROLL ▼ |
| BUTTON ▼ | 40 × 40 OR MORE AND LESS THAN | — × — | SELECTION ▼ |

FIG. 16B

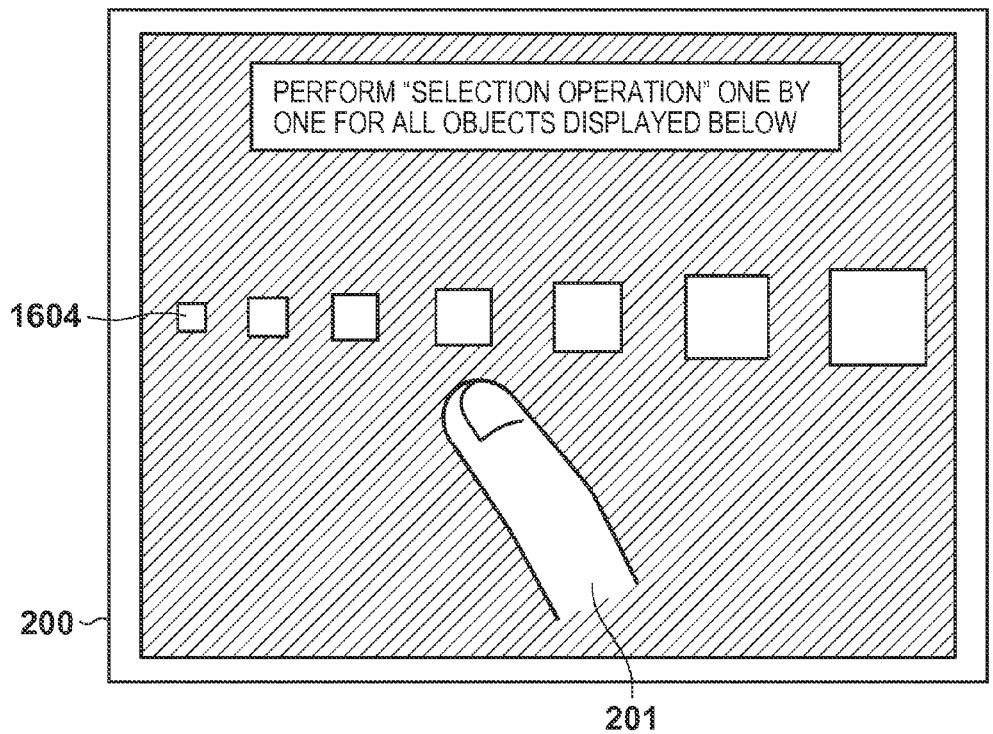

F I G. 18

| OBJECT | SIZE (PIXEL COUNT) | PERMITTED OPERATION |
|---|---|---|
| TEXT BOX | SIZE AT WHICH FINGERTIP CANNOT FIT : LESS THAN 30×30 | ·SCROLL |
|  | SIZE AT WHICH FINGERTIP CAN FIT : 30×30 OR MORE AND LESS THAN 100×100 | ·SELECTION (·SCROLL) |
|  | SIZE AT WHICH HANDWRITING IS POSSIBLE : 100×100 OR MORE | ·HANDWRITTEN CHARACTER INPUT (·SELECTION) |
| IMAGE | SIZE AT WHICH CONTENTS CANNOT BE CONFIRMED : LESS THAN 50×50 | ·SCROLL |
|  | SIZE AT WHICH CONTENTS CAN BE CONFIRMED : 50×50 OR MORE AND LESS THAN 100×100 | ·SELECTION ·MOVE |
|  | SIZE AT WHICH HANDWRITING IS POSSIBLE : 100×100 OR MORE | ·SCRIBBLE |
| LIST BOX | SIZE AT WHICH BALL OF FINGER CANNOT FIT : LESS THAN 40×40 | ·SCROLL |
|  | SIZE AT WHICH BALL OF FINGER CAN FIT : 40×40 OR MORE | ·SELECTION (·SCROLL) |
| BUTTON | SIZE AT WHICH CONTENTS CANNOT BE CONFIRMED : LESS THAN 40×40 | ·SCROLL |
|  | SIZE AT WHICH CONTENTS CAN BE CONFIRMED : 40×40 OR MORE | ·SELECTION (·SCROLL) |
| LINK | SIZE AT WHICH CHARACTER CANNOT BE READ : LESS THAN 30×30 | ·SCROLL |
|  | SIZE AT WHICH CHARACTER CAN BE READ : 30×30 OR MORE | ·SELECTION (·SCROLL) |

INFORMATION PROCESSING APPARATUS, INFORMATION PROCESSING METHOD AND STORAGE MEDIUM

BACKGROUND OF THE INVENTION

1. Field of the Invention

The present invention relates to an information processing apparatus, information processing method, and storage medium.

2. Description of the Related Art

Conventionally, it is general to perform a display screen operation on a personal computer after changing the display magnification to an easy-to-operate one. As a method of changing the display magnification, for example, the user selects a magnification of his choice from a list box, directly inputs a magnification numerically, or moves the slider. Recently, it is rapidly becoming popular to perform enlargement/reduction by a gesture such as opening/closing of two fingers on a touch panel-attached cell phone and personal digital assistant, a touch pad-attached notebook personal computer, and the like. However, if the display magnification is set excessively small on such a device, the operation target object is displayed small, making an operation difficult. As a result, an operating error occurs such that the user selects an object adjacent to one he wants or selects a plurality of objects.

To avoid these operating errors owing to a small display, various methods have been disclosed. For example, in Japanese Patent Laid-Open No. 2004-140811, the display is automatically enlarged at high object density. This prevents erroneous selection of an adjacent object. In Japanese Patent Laid-Open No. 2009-032028, the display is automatically enlarged when a plurality of objects exist within the screen touch range of the finger or the like which performs a selection operation. This prevents selection of a plurality of objects.

However, in Japanese Patent Laid-Open No. 2004-140811, even a small object display is not enlarged when objects are arranged apart from each other. Also in Japanese Patent Laid-Open No. 2009-032028, even a small object display is not enlarged when a plurality of objects do not exist within the screen touch range of the finger or the like. For this reason, the user may touch an object without intention when the object is displayed small and it is hard to see it. Further, when an object is small and it is difficult to confirm its contents, the user may select another object by mistake. It is considered that the user reduces the display because he wants to scroll it while overviewing it. Even if objects are dense, he may not want to automatically enlarge the display. Also, it is considered that the user enlarges an image object because he wants to scribble or input a handwritten character directly to an image object without switching to an image edit mode or the like. However, a conventional device capable of enlarging/reducing the screen allows only the same input operation regardless of the display magnification, and cannot meet the intention of the user who has performed enlargement/reduction.

The present invention provides a technique for preventing an operating error when the operation target object is displayed small, and executing an operation complying with the intention of the user who has enlarged/reduced the screen in consideration of the above problems.

SUMMARY OF THE INVENTION

According to one aspect of the present invention, there is provided an information processing apparatus which accepts one of a plurality of processes of different types in accordance with an operation instruction issued on a display screen, comprising: an input unit adapted to input the operation instruction issued on the display screen; an extraction unit adapted to extract an object of interest out of objects displayed on the display screen based on a position where the operation instruction has been input on the display screen; an obtaining unit adapted to obtain information indicating a display size of the object of interest extracted by the extraction unit; and a determination unit adapted to determine executable processing out of the processes of different types in accordance with the display size.

According to another aspect of the present invention, there is provided an information processing method in an information processing apparatus which accepts one of a plurality of processes of different types in accordance with an operation instruction issued on a display screen, comprising: inputting the operation instruction issued on the display screen; extracting an object of interest out of objects displayed on the display screen based on a position where the operation instruction has been input on the display screen; obtaining information indicating a display size of the object of interest extracted in the extraction; and determining executable processing out of the processes of different types in accordance with the display size.

Further features of the present invention will be apparent from the following description of exemplary embodiments with reference to the attached drawings.

BRIEF DESCRIPTION OF THE DRAWINGS

FIG. 1A is a block diagram exemplifying the hardware configuration of an information processing apparatus according to the present invention;

FIG. 1B is a block diagram exemplifying the software configuration of the information processing apparatus according to the present invention;

FIG. 4 is a table exemplifying a combination of an object size and an operation to be executed;

FIG. 6A is a table exemplifying setting of priority for an operation;

FIG. 6B is a table exemplifying a change of operation priority in accordance with the object size;

FIG. 8 is a flowchart exemplifying processing of allowing execution of an operation when the operation is kept input;

FIG. 10 is a table exemplifying a combination of an object size and a gesture operation to be executed;

FIG. 12 is a table exemplifying conditions when a plurality of objects overlap each other;

FIG. 16A is a view exemplifying a condition change screen;

FIG. 16B is a view exemplifying setting of a condition value using a sample object;

FIG. 18 is a table exemplifying a combination of an object size and an operation to be executed.

DESCRIPTION OF THE EMBODIMENTS

Figure 2A:
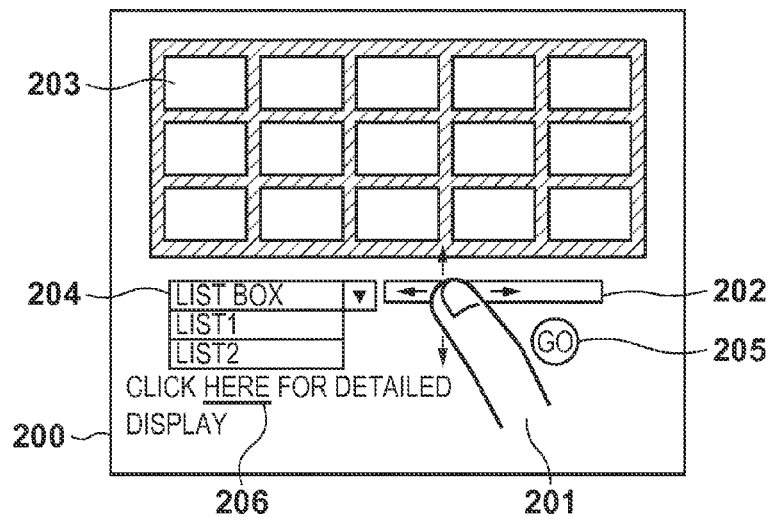
FIGS. 2A to 2C are views exemplifying a Web site displayed at different enlargement magnifications.

An exemplary embodiment(s) of the present invention are described in detail with reference to the drawings. It should be noted that the relative arrangement of the components, the numerical expressions and numerical values set forth in these embodiments do not limit the scope of the present invention unless it is specifically stated otherwise.

(First Embodiment)

The first embodiment will describe a case in which it is determined whether to execute an operation in accordance with the size of an operation target object (object of interest).

FIG. 1A is a block diagram exemplifying the hardware configuration of an information processing apparatus 100 according to the present invention. A bus 101 connects building elements. A CPU (Central Processing Unit) 102 performs calculation, logical determination, and the like for various processes, and controls the building elements connected to the bus 101.

The information processing apparatus 100 incorporates memories including a program memory and data memory. The program memory stores programs for control by the CPU, including various processing sequences (to be described later) according to flowcharts. The memory may be a ROM (Read-Only Memory) 103 or a RAM (Random Access Memory) 104 to which a program is loaded from an external storage device or the like, or may be implemented by a combination of them.

A storage device 105 is, for example, a hard disk which stores data and programs according to the present invention. An external storage device 106 may be used as an alternative having the same functions as those of the storage device 105. The external storage device 106 can be implemented by a medium (recording medium) and an external storage drive for implementing access to the medium. Known examples of the medium are a flexible disk (FD), CD-ROM, DVD, USB memory, MO, and flash memory. In the embodiment, the RAM 104, storage device 105, and external storage device 106 hold necessary information.

An information input device 107 is used to input information from an external apparatus. The information input device 107 receives an operation to the information processing apparatus by the user. The input method is, for example, a pointing device such as a mouse or trackball, or touch input.

An information output device 108 outputs the result of processing by the information processing apparatus 100 and held information to an external apparatus. In the embodiment, the information output device 108 outputs an object generated by the information processing apparatus 100 and information for a screen display such as a display regarding the object, and a screen display device or the like displays them.

FIG. 1B is a block diagram exemplifying the software configuration of the information processing apparatus 100 according to the present invention.

An operation acceptance unit 151 accepts an operation request input from the information input device 107 to the information processing apparatus 100. The operation request is input using a device such as a mouse, trackball, touch pad, touch panel, stylus pen, pen tablet, or keyboard. For a touch-sensitive device, input using the finger or pen is conceivable.

An object extraction unit 152 extracts an object present at the position on the screen where an operation accepted by the operation acceptance unit 151 has been input.

An object size measurement unit 153 measures the display size of the object extracted by the object extraction unit 152. The object size may be measured by pixels, display length, or area.

Based on the object size measured by the object size measurement unit 153, an operation execution determination unit 154 determines whether to actually execute the operation accepted by the operation acceptance unit 151. More specifically, a condition which sets in advance a combination of an object size and executable operation instruction is stored as definition data, and whether acceptance is possible is determined based on the condition.

When the operation execution determination unit 154 determines that the operation can be executed, an operation execution unit 155 executes processing corresponding to the operation. The operation execution unit 155 notifies the information output device 108 of the execution result, reflecting the execution result on the display device such as the screen.

Figure 2B:
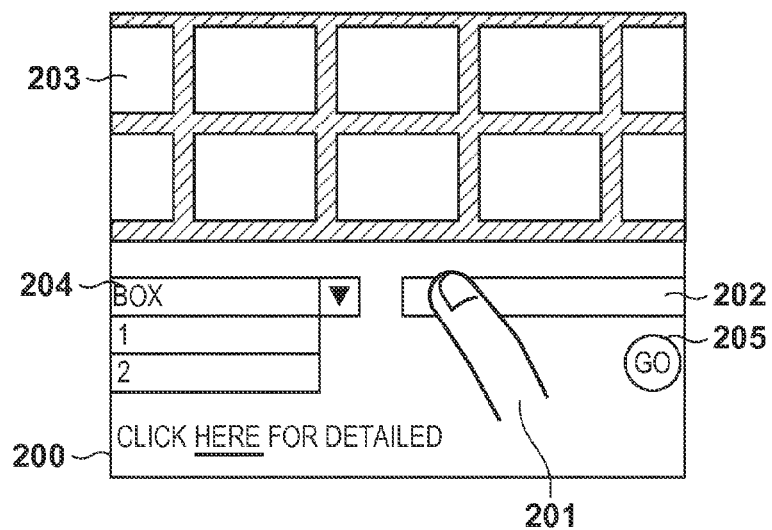
Figure 2C:
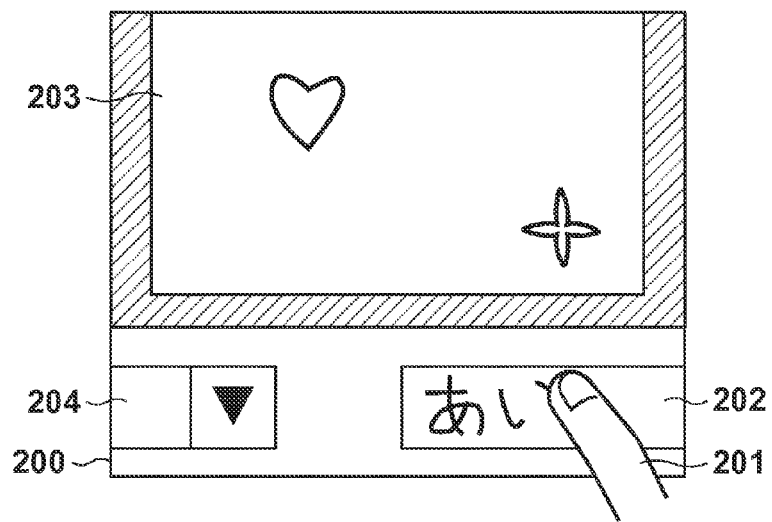

Display of a Web site at different enlargement magnifications are explained with reference to FIGS. 2A to 2C by exemplifying a case in which the information processing apparatus 100 according to the present invention is mounted in a touch panel-attached personal digital assistant. FIGS. 2A to 2C are views exemplifying a Web site displayed at different enlargement magnifications. The screen images an image sharing site. Although a Web site is exemplified here, the present invention is not limited to a Web site and is applicable to an application installed in a personal digital assistant or PC.

FIG. 2A is a view exemplifying the normal display or reduced display of the Web site.

A screen 200 is the display screen of a personal digital assistant and is assumed not to be so large because portability is important. In the normal display or reduced display, objects such as a text, image, button which form the Web site are displayed very small, and it is difficult to see them. A touch panel is attached to the screen, and is assumed to be able to input on the display screen using the finger, stylus pen, or the like. However, no touch panel may be attached, and input using a mouse, trackball, hard button, keyboard, or the like is also possible without attaching the touch panel. The screen enlargement/reduction operation is determined to be an enlargement operation when the interval between two points touching the screen increases, and a reduction operation when the interval decreases. Alternatively, a slider may be provided on the screen to perform enlargement/reduction in accordance with the slider position, enlargement and reduction buttons may be prepared, or the magnification may be directly designated.

A finger 201 is a user's finger. The finger 201 directly touches the touch panel-attached screen 200 to perform various operations.

A text box 202 allows inputting a text. By selecting the text box, the screen shifts to a text input screen, or a text input dialog appears to allow text input. However, when the text box 202 is displayed small, like the example of FIG. 2A, it is difficult to select the text box 202 by touching it with the finger 201 because the display is smaller than the fingertip. In this difficult-to-select state, the user may not forcibly perform a selection operation. Hence, when an object is displayed at a size not enough for selection, the information processing apparatus 100 accepts only a scroll operation indicated by arrows in FIG. 2A without accepting a selection operation. The scroll operation can move the entire screen in a direction the user wants by dragging a portion having no object in general. In the example of FIG. 2A, even dragging on the text box serving as an object is regarded as a scroll operation. Accepting only the scroll operation can prevent cumbersome screen transition caused by erroneous selection of an object though the user wants to only scroll.

An image 203 is arranged on the Web site. This example assumes an image shared on the Web. The user can select an image by touching it, download it, and edit the selected image separately on an image edit screen. However, when the image is displayed small, like the example shown in FIG. 2A, it is difficult to confirm the image contents, and the user may not select a specific image without knowing the image contents. Thus, the information processing apparatus 100 according to the embodiment accepts only a scroll operation even on the image without accepting a selection operation.

A list box 204 describes lists. Lists are presented by touching and selecting the list box 204 displayed on one line. The user can select one of the lists by touching it with the finger, touch pen, or the like. However, when the list is displayed small, like the example shown in FIG. 2A, it is hard to read characters and determine which of lists is to be selected because the user cannot grasp the contents. Since a list item is close to an adjacent one, it is difficult to select an item of the user's choice with the finger at a size as in the example shown in FIG. 2A. Hence, the information processing apparatus 100 according to the embodiment accepts only a scroll operation even on the list box without accepting a selection operation.

The user touches a button 205 to make a selection, and an operation assigned to the button is executed. However, when the button is displayed small as shown in FIG. 2A, it is hard to see characters written on the button and determine the function of the button. Further, the button is too small to select it with the finger, and a selection operation is difficult. For this reason, the information processing apparatus 100 according to the embodiment accepts only a scroll operation even on the button without accepting a selection operation.

A link 206 is selected by touching an underlined text part, and the screen changes to another linked page. However, when the link is displayed small as shown in FIG. 2A, it is hard to see characters and determine the link destination. In addition, the link is too small to select it with the finger, and a selection operation is difficult. Even if the user wants to perform a scroll operation, it is difficult to discriminate merely characters from the link, and the user may erroneously select the characters. To prevent this, the information processing apparatus 100 according to the embodiment accepts only a scroll operation even on the link without accepting a selection operation.

FIG. 2B is a view showing the Web site displayed after being enlarged from that in FIG. 2A. The text box 202 is enlarged and displayed at a size large enough for the tip of the finger 201 to fit in it. The user can easily perform a selection operation. The information processing apparatus 100 accepts a selection operation without accepting a scroll operation on the text box 202.

The image 203 is enlarged and displayed at a size large enough to confirm the image contents. The user can easily find out an image of his choice. The information processing apparatus 100 accepts a selection operation without accepting a scroll operation on the image 203.

The list box 204 is enlarged to a size large enough to easily read a character and facilitate a selection operation with the fingertip. The information processing apparatus 100 accepts a selection operation without accepting a scroll operation on the list box 204. Since list items in the list box 204 are adjacent to each other, erroneous selection of an adjacent item readily occurs. To prevent this, a selection operation may be enabled when the list box 204 is displayed at a size large enough for the entire ball of the finger to fit in it.

The button 205 is enlarged to a size large enough to easily see characters written on the button and determine the function of the button. Hence, the information processing apparatus 100 accepts a selection operation without accepting a scroll operation on the button 205.

The link 206 is enlarged to a size large enough to see characters and perform a selection operation with the fingertip. The information processing apparatus 100 accepts a selection operation without accepting a scroll operation on the link 206.

In the example of FIG. 2B, no scroll operation on an object is accepted. However, as another method, a tap operation (operation of only one light touch) may be determined as a selection operation, and a drag operation may be determined as a scroll operation. This enables accepting both a selection operation and scroll operation on an object.

FIG. 2C is a view showing the Web site displayed after being further enlarged from that in FIG. 2B.

The text box 202 is further enlarged to a size much larger than the tip of the finger 201. The information processing apparatus 100 accepts a handwritten character input operation to the text box 202. That is, the information processing apparatus 100 accepts an operation of a different type from the above-mentioned scroll operation. At this time, a handwritten input character is recognized and converted into text data, which is input to the text box 202. In the state of FIG. 2C, the information processing apparatus 100 does not accept a scroll operation on the text box 202 not to mistake it for a handwritten character input operation. No selection operation may be accepted, similar to a scroll operation. Alternatively, a tap operation (operation of only one light touch) may be determined as a selection operation, and movement of a touched point, like a drag operation, may be determined as a handwritten character input operation.

The image 203 is enlarged to a size much larger than the tip of the finger 201. The information processing apparatus 100 accepts a scribble operation (rendering operation) to the image 203 without accepting a scroll operation on the image 203. No selection operation may be accepted, similar to a scroll operation. Alternatively, a tap operation (operation of only one light touch) may be determined as a selection operation, and movement of a touched point, like a drag operation, may be determined as a scribble operation.

As for the remaining objects, the same processes as those in FIG. 2B are performed.

As described above, when the operation target object is small, a selection operation is difficult. It is therefore considered that the user intends to perform a scroll operation rather than a selection operation by making full use of the overview state. In this case, the information processing apparatus 100 according to the embodiment can accept only a scroll operation to meet the user's intention. An operating error when an object is small and it is difficult to select it can be prevented. After the object is enlarged and displayed in the easy-to-select state, a selection operation can be accepted. When the text box and image are displayed large upon further enlargement, the information processing apparatus can meet a request to directly input a handwritten character or scribble without cumbersomely shifting to an edit screen.

Figure 3:
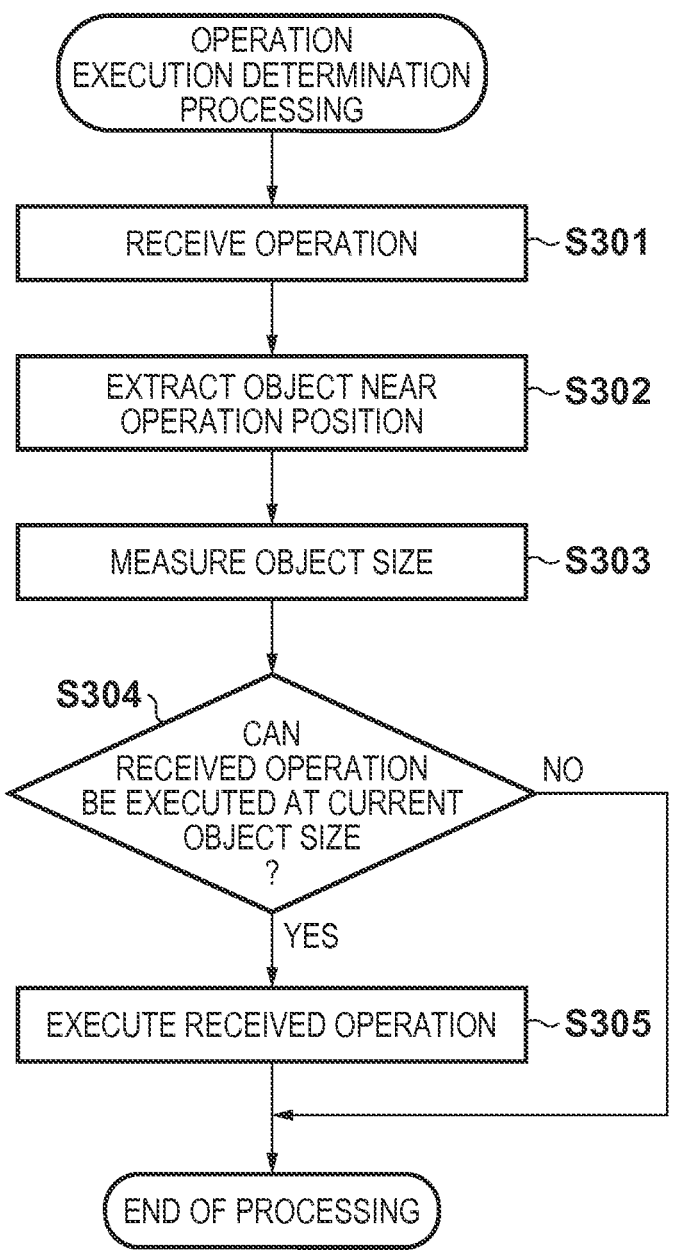
FIG. 3 is a flowchart exemplifying operation execution determination processing.

Processing of determining, based on the object size, whether to execute an accepted operation will be exemplified with reference to FIG. 3. FIG. 3 is a flowchart exemplifying operation execution determination processing.

In step S301, the operation acceptance unit 151 performs operation reception processing to receive a user operation instruction input from the information input device 107. In step S302, the object extraction unit 152 extracts an object near the operation position. More specifically, the object extraction unit 152 extracts an object present near the position where the operation received in step S301 has been input. The object present near the position where the operation has been input is, for example, an object closest to the start point where the operation has been input. More specifically, an object present at a position having a minimum distance from the position where the operation instruction has been input is extracted out of objects present at the position where the operation instruction has been input or objects at a predetermined distance from the position. As another example, when a point designating an operation moves, an object having the longest distance by which the point has passed may be selected. An object closest to each coordinate point input for the operation may be extracted.

In step S303, the object size measurement unit 153 performs object size measurement processing. More specifically, the object size measurement unit 153 measures the size (display size) of the object extracted in step S302 on the display. The size is measured by extracting the circumscribed rectangle of the object and calculating the vertical and horizontal pixel counts of the circumscribed rectangle. As another example, a pixel count indicating the object area may be measured.

In step S304, it is determined based on the object size measured in step S303 whether to actually execute the operation received in step S301. For example, when the display size is equal to or smaller than a threshold, it is determined that processing corresponding to the operation instruction cannot be executed. When the display size is larger than the threshold, it is determined that processing corresponding to the operation instruction can be executed. If it is determined that the processing can be executed (YES in step S304), the process advances to step S305. If it is determined that the processing cannot be executed (NO in step S304), the process directly ends.

In step S305, received operation execution processing is performed. Processing corresponding to the operation received in step S301 is executed. Accordingly, selection processing, scroll processing, or the like in FIG. 3 is executed.

A detailed method of determining whether to execute an accepted operation will be exemplified with reference to FIG. 4. FIG. 4 exemplifies a combination of an object size and an operation to be executed. FIG. 4 exemplifies, as a table, conditions necessary to make an operation execution determination as in FIGS. 2A to 2C. This table is stored as definition data and can be used to make an operation execution determination.

The first column of the table is an object type 401, and separate settings can be made for respective object types. However, all objects can have common settings without preparing this item. In the example of FIG. 4, the object type 401 includes a text box, image, list box, button, and link as shown in FIGS. 2A to 2C. When another object type appears on the screen, the object type 401 may be further set. The object type 401 may set an object within an image that is obtained by object recognition using an image recognition technique. For example, objects such as a person, building, car, and ship in an image are conceivable.

The second column of the table is a size 402, and an object size is set as a determination criterion when accepting an operation. In the example of FIG. 4, the size is expressed by the vertical and horizontal pixel counts of an object. Alternatively, the size may be set as an area such as "smaller than 900 pixels" or by millimeters.

The third column of the table is a permitted operation 403, and an operation to be accepted when the object size matches the size 402 set on the second column is set. For example, to make a determination as in FIGS. 2A to 2C for the text box, a condition that a size such as "less than 30×30 pixels" at which the fingertip does not fit in the text box is set in the second column, and a scroll operation is set as an operation permitted when this condition is satisfied. Then, a condition that a size such as "30×30 pixels or more and less than 100×100 pixels" at which the fingertip fits in the text box is set, and a selection operation is set as an operation permitted when this condition is satisfied. Further, a condition that a size such as "100×100 pixels or more" at which handwriting is possible is set, and a handwritten character input operation is set as an operation permitted when this condition is satisfied.

Settings are similarly made for the remaining object types, and a condition table as in FIG. 4 is defined, enabling a determination as in FIGS. 2A to 2C. The size 402 set in FIG. 4 is merely an example, and other pixel counts may be set. In particular, the easy-to-operate object size changes depending on the screen dimensions, display resolution, and display device performance. Thus, settings may be changed in accordance with the use situation. Further, the easy-to-operate object size changes upon a change of the operation input medium such as the finger, pen, or mouse. Therefore, condition tables may be prepared for respective input media and switched based on an input medium detected in input medium detection processing. As a method of detecting an input medium for the touch panel, input media can be discriminated based on the difference in input detection method (for example, electrostatic capacitance method or electromagnetic induction method), the contact area on the touch panel, or the like. When an acceleration sensor is mounted in the personal digital assistant, it is also possible to determine, from a swing detected by the acceleration sensor, whether the user is walking, and if so, switch the condition table to a table for walking. Alternatively, condition tables corresponding to magnitudes of the swing may be prepared and switched in accordance with the swing magnitude. Even permitted operations are not limited to the contents of FIG. 4, and another operation may be set. A permitted gesture operation may be set in an environment where gesture recognition is available.

In this manner, a condition which sets the object size 402 and corresponding permitted operation 403 is stored as definition data. A determination as in FIGS. 2A to 2C can be made using the condition.

Figure 5:
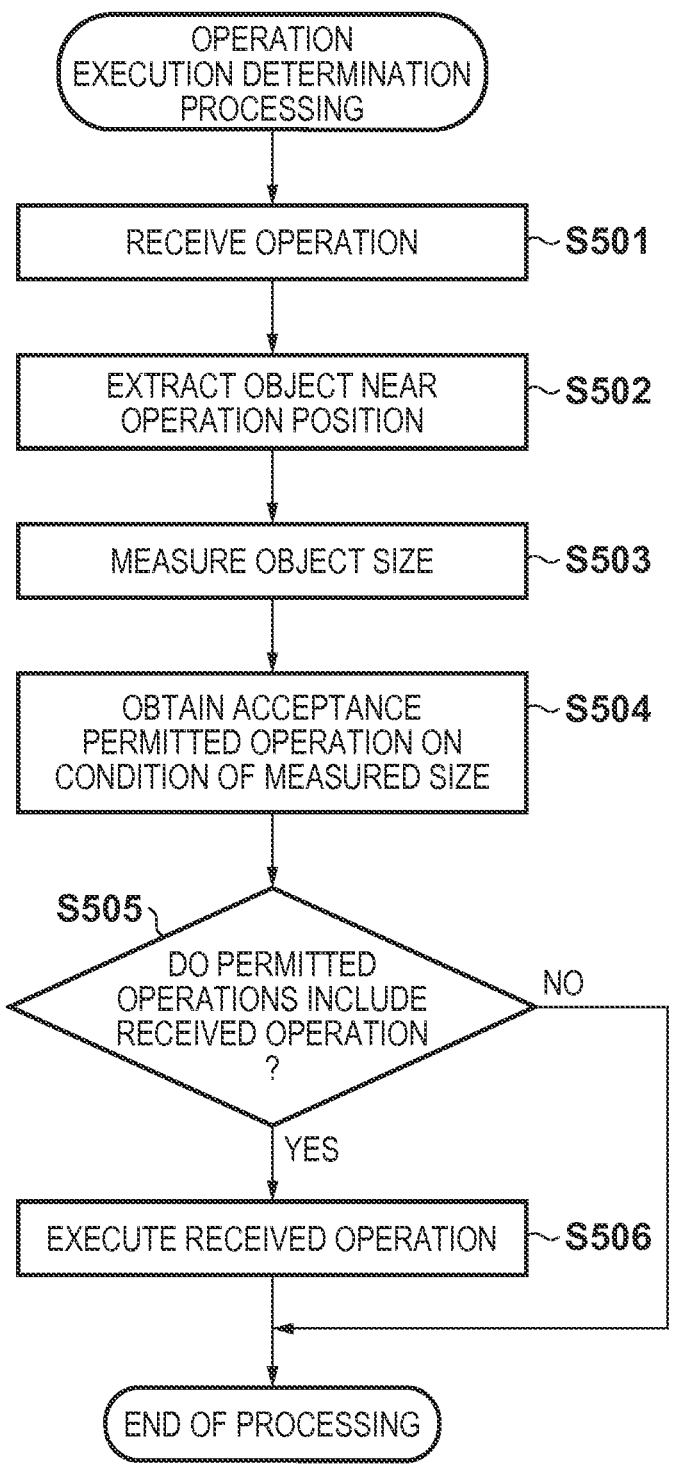
FIG. 5 is a flowchart exemplifying processing of determining, based on the condition, whether to execute an operation.

Processing of determining, based on the condition, whether to execute an accepted operation will be exemplified with reference to the flowchart of FIG. 5.

Processes in steps S501 to S503 are the same as those in steps S301 to S303 of FIG. 3. The size of an object near the position where an operation has been input is measured.

In step S504, permitted operation obtaining processing is performed. A condition table as shown in FIG. 4 that has been defined in advance is searched based on an object extracted in step S502 and a size measured in step S503, obtaining permitted operations.

In step S505, it is determined whether the permitted operations obtained in step S504 include the operation received in step S501. If the permitted operations include the received operation, it is determined that the received operation can be executed (YES in step S505), and the process advances to step S506. If the permitted operations do not include the received operation, it is determined that the received operation cannot be executed (NO in step S505), and the process ends without executing the operation received in step S501. In step S506, processing corresponding to the operation received in step S501 is executed, similar to the example of FIG. 3.

As described above by exemplifying FIGS. 4 and 5, a combination of the display size of an operation target object and an operation to be accepted is set in advance as a condition. Based on the condition, an operation corresponding to the object size can be accepted.

Another detailed method of determining whether to accept an operation will be exemplified with reference to FIGS. 6A and 6B. FIGS. 6A and 6B are tables exemplifying a change of operation priority in accordance with the object size.

FIG. 6A shows priority 602 at the beginning for each operation when an operation 601 is performed on an object. In the example of FIG. 6A, a selection operation has top priority. This means that a selection operation is preferentially accepted basically. In this state, however, when the user wants to perform a scroll operation and erroneously touches an object, the object is undesirably selected. Also in this state, an operation to an object other than selection cannot be accepted. To permit an operation other than selection, priority is changed by mode switching. Further, operation priority may be set separately for each object.

FIG. 6B shows, as a table, a state after changing priority 614 of each operation 613 in accordance with a size 612 of an object type 611. For example, when the size of an operation target text box is smaller than 30×30 pixels, the priority of scroll is changed to be high. An operation to be accepted can be switched in accordance with the size of an operation target object. In the example of FIG. 6B, separate settings are made for respective object types by arranging the item of the object type 611 on the first column. However, all object types may have common settings without arranging this column.

Figure 7:
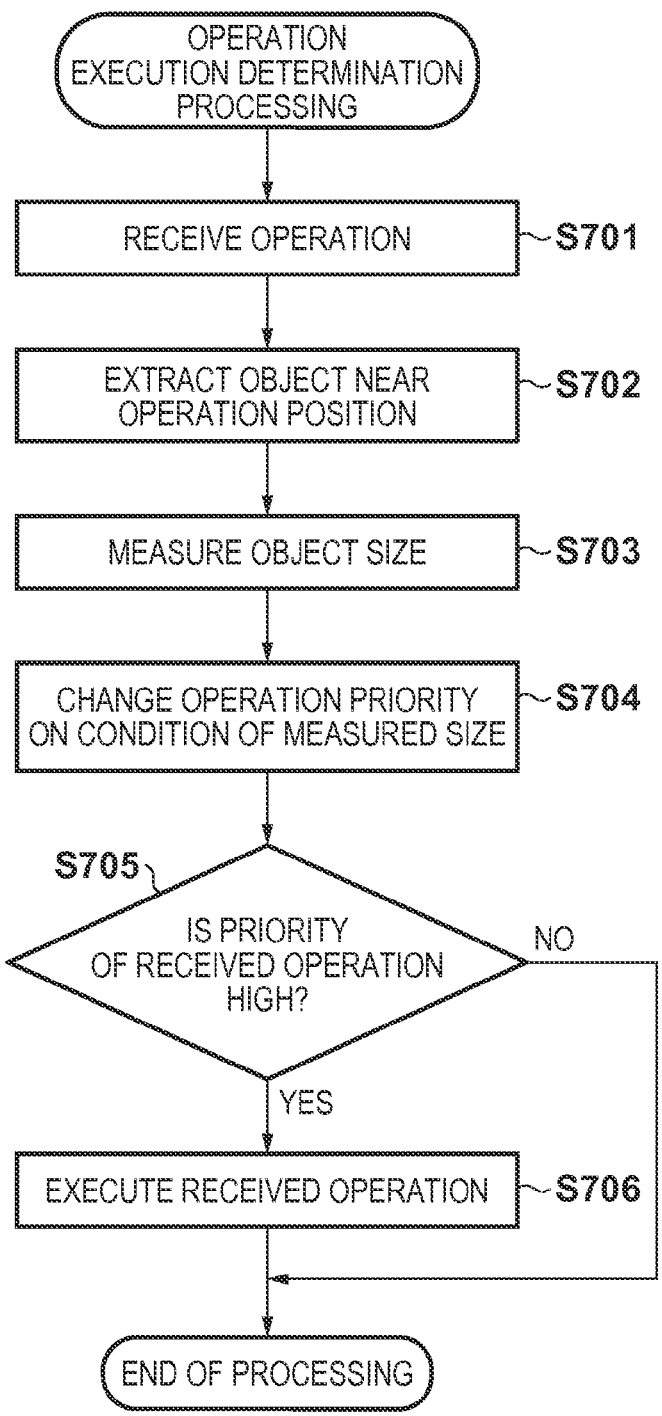
FIG. 7 is a flowchart exemplifying processing of determining, based on the priority, whether to execute an operation.

Processing of determining, based on the priority, whether to execute an accepted operation will be exemplified with reference to the flowchart of FIG. 7.

Processes in steps S701 to S703 are the same as those in steps S301 to S303 of FIG. 3. The size of an object near a position where an operation has been input is measured.

In step S704, the operation priority is changed based on an object size measured in step S703. More specifically, the operation priority is changed based on the object size, as shown in the tables of FIGS. 6A and 6B.

In step S705, it is determined whether the priority of the operation received in step S701 is high. If the priority is high (YES in step S705), the process advances to step S706 to execute processing corresponding to the received operation. If the priority of the received operation is low (NO in step S705), the process ends.

As described above by exemplifying FIGS. 6 and 7, the operation priority is changed based on the display size of an operation target object. Based on the priority, an operation corresponding to the object size can be accepted.

In the above examples, the operation is switched between scroll, selection, handwriting, and the like based on the object size, but another operation is also applicable.

Another example are explained with reference to FIG. 18. FIG. 18 exemplifies a case corresponding to an operation other than those in FIG. 4. FIG. 18 shows, as a table, each operation 1803 corresponding to a size 1802 of an object type 1801. For example, even for the same operation of moving the finger, an operation to be accepted is changed based on the size of an image object.

When the size of an image object serving as the object 1801 is smaller than 50×50 pixels and it is difficult to confirm the image contents, an operation of moving the finger on the image is an entire screen scroll operation. At this time, nothing may be done when the finger is released without moving it on the image. When the size of an image object is equal to or larger than 50×50 pixels and smaller than 100×100 pixels and is large enough to confirm the image contents, an operation of moving the finger on the image is an image moving operation, and the image can be moved to another location. At this time, when the finger is released without moving it on the image, an image object touched with the finger may be selected. When the size of an image object is equal to or larger than 100×100 pixels and is sufficiently large, an operation of moving the finger on the image is a handwritten character input or scribble operation. At this time, when the finger is released without moving it on the image, nothing may be done, an image object touched with the finger may be selected, or a point touched with the finger may be rendered as a scribble.

For example, a scroll operation is validated at a current display size of 50% with respect to the standard size of a button object, a selection operation is validated at 100%, and a handwriting operation is validated at 200%.

An operation to be validated may be determined based on the display magnification of the entire screen. For example, a scroll operation is validated at a display magnification of 50%, a selection operation is validated at 100%, and a handwriting operation is validated at 200%. This method is effective when, for example, objects have the same size, like a list of photographs.

Even a case in which objects have different sizes, like FIGS. 2A to 2C, can be coped with by setting different display magnifications of the entire screen for respective objects.

As described above, the information processing apparatus 100 according to the embodiment changes an operation to be accepted in accordance with the size of an operation target object. This can prevent an operating error even when the operation target object is displayed small. In addition, an operation can be accepted in accordance with the intention of the user who has changed the screen magnification to change the size of a displayed object.

(Second Embodiment)

The second embodiment will describe a configuration which allows execution of an operation when the operation is kept input.

Processing of allowing execution of an operation when the operation is kept input according to the second embodiment are explained with reference to the flowchart of FIG. 8.

Processes in steps S801 to S803 are the same as those in steps S301 to S303 of FIG. 3. The size of an object near a position where an operation has been input is measured. In step S804, it is determined whether a received operation can be executed at the current object size. If it is determined that the operation can be executed (YES in step S804), the process advances to step S805. If it is determined that the operation cannot be executed (NO in step S804), the process advances to step S806.

In step S806, it is determined whether the operation is kept input. For example, for a selection operation of touching the screen, it is determined whether the user keeps touching the screen. As another example, for a scroll operation by a drag operation on the screen, if it is detected that dragging continues or a position after dragging is kept touched, it may be determined that the operation continues. If the duration exceeds a predetermined time (YES in step S806), the process advances to step S807. If the duration does not exceed a predetermined time (NO in step S806), the process ends directly.

If it is determined in step S806 that the operation is kept input, the display magnification of the screen is calculated in step S807. As the calculation method, first, a necessary object size is calculated so that the received operation can be accepted. Then, the display magnification of the screen is calculated and determined so that the object extracted in step S802 has the calculated size.

In step S808, the entire screen, part of the screen, or the object extracted in step S802 is enlarged or reduced based on the display magnification calculated in step S807.

In step S805, the operation received in step S801 is executed. In the example of FIG. 8, the display magnification is changed in the processes of steps S807 and S808. However, when the operation simply continues, it may be accepted to execute processing. Alternatively, only display magnification calculation processing in step S807 may be performed to display the display magnification on the screen and present it to the user.

As described above, even if execution of an input operation is not permitted but the user wants to input the operation, execution of the input operation is allowed by continuing the input operation, and the user can perform the input operation. Thus, neither an enlargement operation nor reduction operation need be performed separately. Also, an enlargement magnification for setting a size necessary to originally input an operation which has become executable is presented, notifying the user of the original size necessary for the operation. Further, an actual display at this enlargement magnification facilitates a subsequent operation.

(Third Embodiment)

In the third embodiment, an example of accepting a more complicated gesture operation as the size of an operation target object increases will be described with reference to FIGS. 9A and 9B.

Figure 9A:
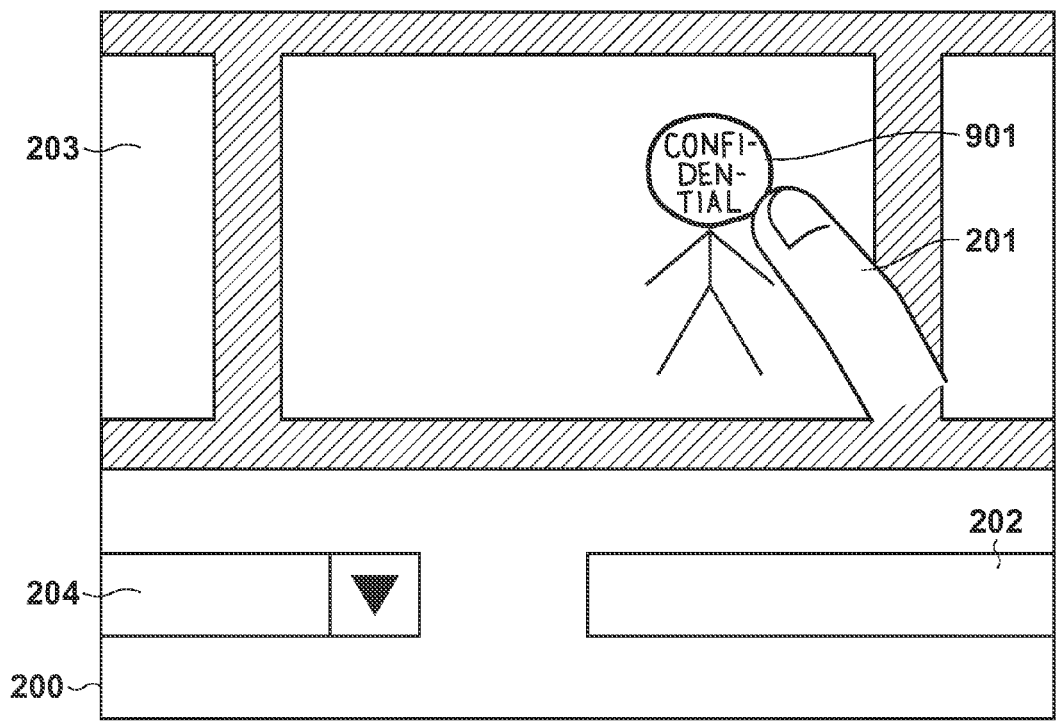
FIGS. 9A and 9B are views showing an example of executing a complicated gesture operation when the operation target object is large.

FIG. 9A is a view showing a Web screen enlarged to a certain degree in the same use case as that in FIGS. 2A to 2C. A center image is a person. A gesture 901 is handwriting input with a finger 201. In the example of FIG. 9A, rendering of "confidential" is recognized as a "confidential" gesture, and setting of a "confidential" stamp (display icon) is assumed. However, when an image object is small or a recognized person object is small, like the example of FIG. 9A, it is difficult to input a complicated gesture such as the "confidential" gesture. As a consequence, the gesture shape may be lost, like FIG. 9A, causing a recognition error. To prevent this, when an object is displayed small, an information processing apparatus 100 does not accept a complicated gesture.

Figure 9B:
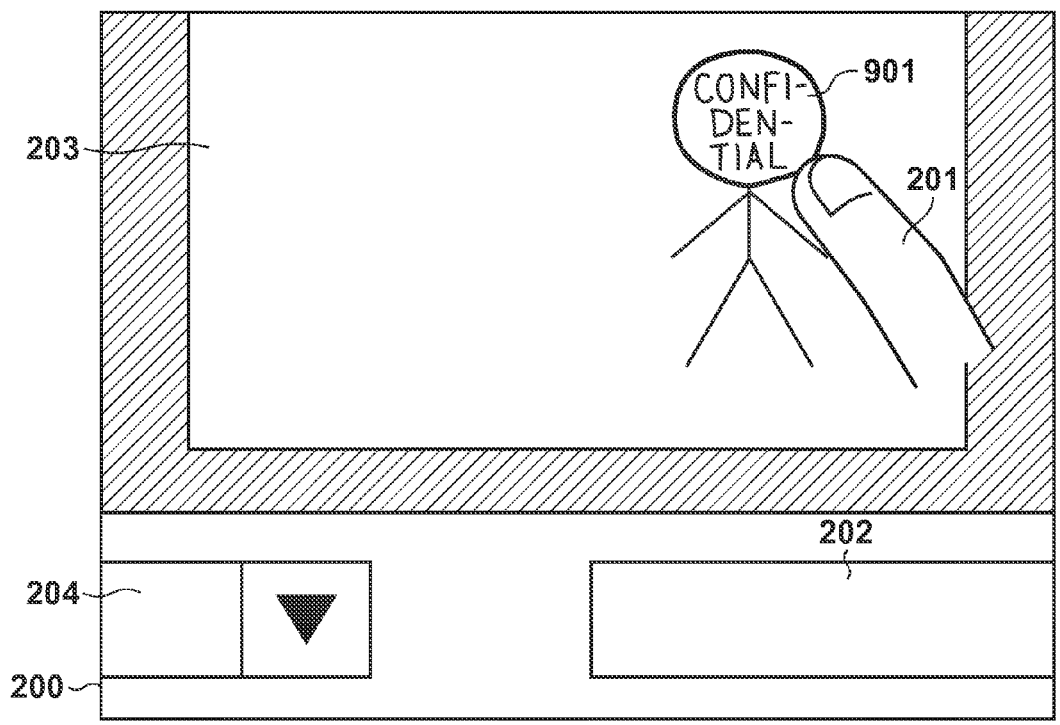

FIG. 9B is a view showing the Web screen displayed after being enlarged from that in FIG. 9A. The person is displayed large. In this state, the gesture 901 can be input large with a better shape. Therefore, when an object is displayed large, the information processing apparatus 100 accepts a gesture with a high stroke count or a complicated shape.

Assume that an operation instruction is input and designates, by a sign or character, a display icon to be displayed on an object present on the display screen. When the display size of the object is equal to or smaller than a threshold and the stroke count of the sign or character is equal to or smaller than a predetermined integral value, it is determined that display icon display processing corresponding to the operation instruction can be executed (display execution determination processing). If it is determined that display icon display processing can be executed, display icon display processing corresponding to the operation instruction is executed.

In this fashion, even when the user inputs a gesture at an intentionally determined position or size, whether to allow acceptance of the gesture is switched based on the size of a target object the user tries to input, thereby reducing a gesture recognition error.

A condition table which sets a combination of an object size and a gesture operation to be accepted will be exemplified with reference to FIG. 10.

FIG. 10 shows, as a table, conditions necessary to make an operation execution determination described with reference to FIGS. 9A and 9B. The items of an object type 1001 and size 1002 are the same as those in FIG. 4, but the third column is a permitted gesture 1003. The permitted gesture 1003 may be set in the permitted operation of FIG. 4 or configured as shown in FIG. 10. In the example of FIG. 10, when the object type 1001 is an intra-image object recognized within an image and the size 1002 is smaller than 30×30 pixels, an object is excessively small, and no gesture operation is accepted (no permitted gesture 1003). When the size 1002 is equal to or larger than 30×30 pixels and smaller than 50×50 pixels, the gesture operation of an only simple sign such as "circle", "triangle", or "square" is accepted as the permitted gesture 1003. When the size 1002 is equal to or larger than 50×50 pixels and smaller than 100×100 pixels, the gesture operation of a slightly complicated sign such as "star", "note", or "G clef" is additionally accepted as the permitted gesture 1003. When the size 1002 is sufficiently large, for example, 100×100 pixels or more, the gesture operation of a complicated sign such as "confidential", "special", or "Co., Ltd." is further additionally accepted as the permitted gesture 1003.

As described above, the information processing apparatus 100 according to the third embodiment accepts a more complicated gesture operation as the size of an operation target object increases. A gesture operation can be accepted in accordance with the intention of the user who has changed the size of a displayed object. At a size at which a recognition error readily occurs, no complicated gesture operation is accepted, reducing the recognition error.

(Fourth Embodiment)

In the fourth embodiment, an operation execution determination when a plurality of objects overlap each other will be described first with reference to FIGS. 11A and 11B. The example of FIGS. 11A and 11B assumes the screen display of an application or Web site capable of an image album layout.

Figure 11A:
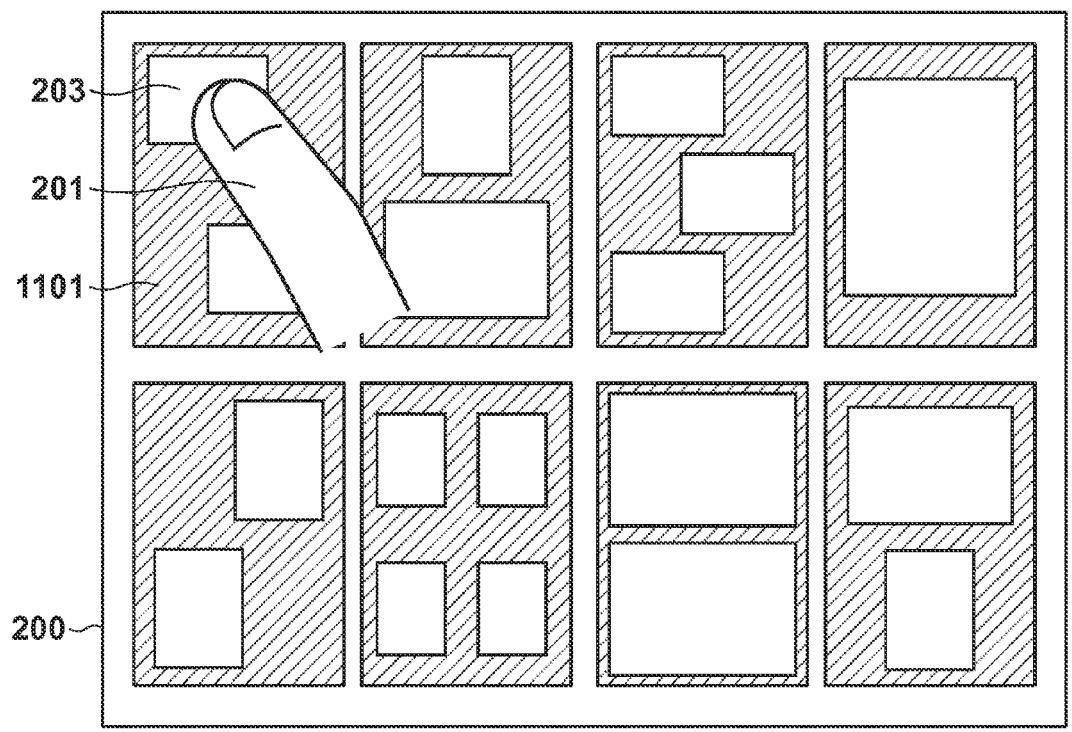
FIGS. 11A and 11B are views exemplifying an operation execution determination when a plurality of objects overlap each other.

FIG. 11A shows an album layout screen in a normal display or reduced display.

A page 1101 is one page of an album. In the example of FIG. 11A, four two-page spreads are displayed within the screen. The user moves a finger 201 close to an image 203 to operate it. The image 203 and page 1101 exist below the finger 201, and whether to accept an operation is determined in consideration of the conditions of both the image 203 and page 1101. For example, this size is large enough to confirm the contents of the image 203 and easily select the image 203 with the finger. Thus, a selection operation for the image 203 is accepted. The page 1101 is not so large, and no operation is particularly permitted.

Figure 11B:
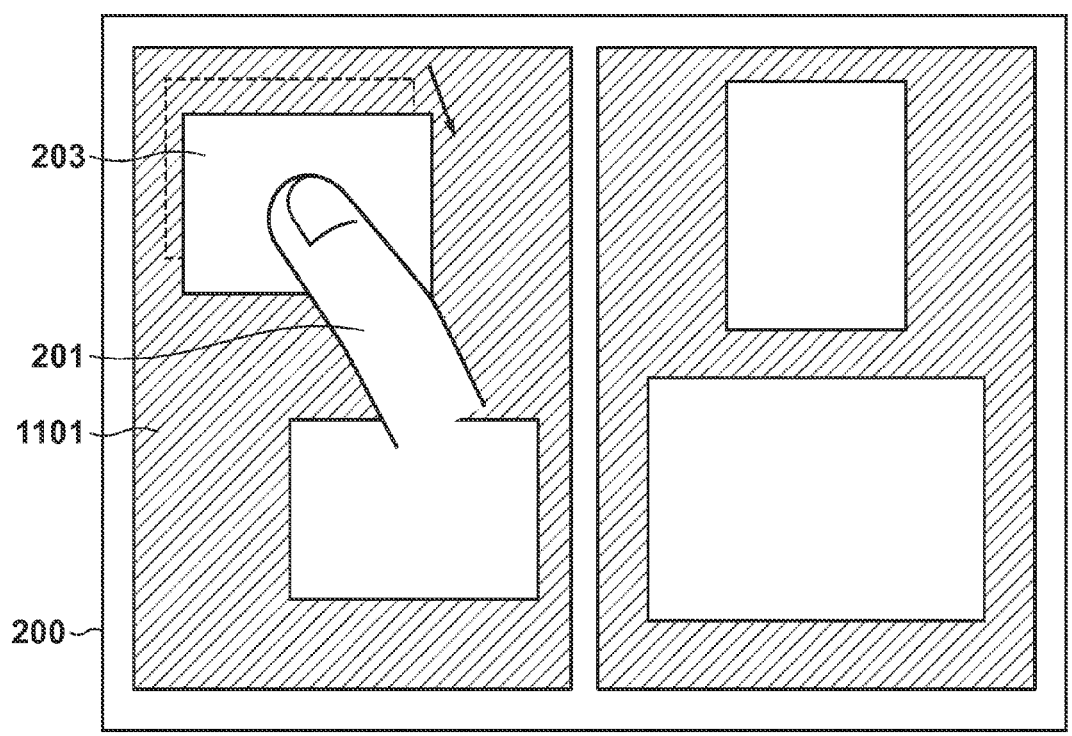

FIG. 11B exemplifies the album layout screen displayed after being enlarged from that in FIG. 11A. In this example, an upper left two-page spread in FIG. 11A is displayed at the center.

In this case, the size of the image 203 is larger than that in FIG. 11A. Thus, a selection operation is accepted similarly to FIG. 11A. Further, the size of the page 1101 is also sufficiently large. Therefore, acceptance of a layout operation to position the image 203 is permitted. In the layout operation, the user moves the image 203 to a position of his choice by, for example, a drag operation.

By combining the conditions of a plurality of objects, a complicated situation can be determined in accordance with the characteristics of the respective objects. In the example of FIGS. 11A and 11B, if the page 1101 is small, it is difficult to finely adjust the position of the image 203. Thus, no layout operation is accepted. This can prevent great misalignment of the image 203 caused by erroneously moving the image 203.

Condition settings when a plurality of objects overlap each other will be exemplified with reference to FIG. 12. FIG. 12 exemplifies conditions for implementing the determination in FIGS. 11A and 11B.

The first, second, and fourth columns are the same as those in FIG. 4. However, an object type 1201 on the first column and a size 1202 on the second column allow simultaneously setting a plurality of object conditions. The third column is priority 1203. The fourth column shows a permitted operation 1204. Considering a case in which a plurality of conditions are satisfied at the same time, a condition to be applied is determined based on the priority. If conditions are strictly defined not to simultaneously satisfy a plurality of conditions, this item may be omitted.

In the example of FIG. 12, settings for an image object are the same as those in FIG. 4. Further, a condition for a combination of an image object and page object is added. As conditions for the combination, a condition that an image has a size of 50×50 pixels or more enough to confirm the contents, and a condition that a page has a size of 100×100 pixels or more enough for fine adjustment are set at the same time. It is set to accept a layout operation capable of finely adjusting the image position when these conditions are satisfied simultaneously. However, the setting in which an image has a size of 50×50 pixels or more may be satisfied at the same time as a condition that an image has a size of 100×100 pixels or more. In this case, a preferential condition is determined by referring to the priority 1203. In the example of FIG. 12, priority is given to the condition that an image has a size of 100×100 pixels or more. It is also possible that a condition of priority level 3 is not strictly set to the condition of 50×50 pixels or more and smaller than 100×100 pixels, and is simply a condition of 50×50 pixels or more. When an image becomes 100×100 pixels or more, a condition of priority level 1 is automatically selected. If conditions have the same priority level, all operations having this priority level may be accepted.

By combining a plurality of objects to express one condition, a more complicated situation can be determined. By setting priority, no strict size condition need be set, and settings can be made easily. Even a subsequent setting change does not affect other conditions.

Figure 13:
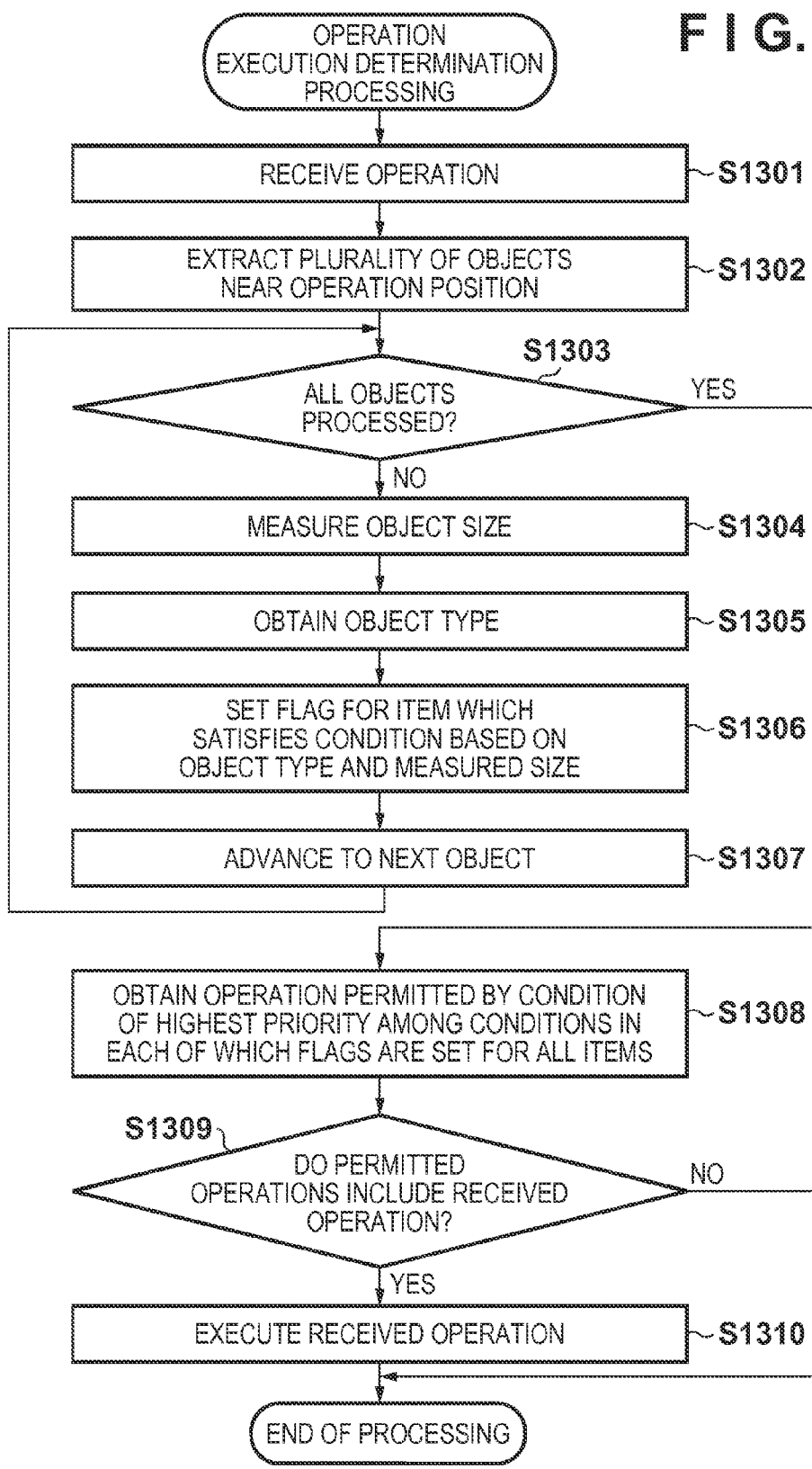
FIG. 13 is a flowchart exemplifying operation execution determination processing when a plurality of objects overlap each other.

Operation execution determination processing when a plurality of objects overlap each other will be exemplified with reference to FIG. 13.

Processing in step S1301 is the same as that in step S301 of FIG. 3, and an operation input by the user is received.

In step S1302, a plurality of objects near the operation position are extracted. All objects positioned at the start point where the operation has been input are extracted. As another method, a plurality of objects present at a predetermined distance from the position where the operation has been input may be extracted.

In step S1303, it is determined whether all the objects extracted in step S1302 have been processed. The completion determination processing is processing in steps S1304 to S1307. If it is determined that all the objects have been processed (YES in step S1303), the process advances to step S1308. If it is determined that not all the objects have been processed (NO in step S1303), one of unprocessed objects is selected and the process advances to step S1304.

Processing in step S1304 is the same as that in step S303 of FIG. 3, and the size of the object selected in step S1303 is measured.

Processing in step S1305 is object type obtaining processing, and the type of object selected in step S1303 is obtained.

Processing in step S1306 is flag setting processing. More specifically, a condition table as shown in FIG. 12 is searched based on the object size measured in step S1304 and the object type obtained in step S1305, and a flag is set for an item which satisfies a condition. For example, referring to FIG. 12, when the object type is an image and the size is 100×100 pixels, flags are set for items regarding image objects of priority levels 1 and 2 which satisfy the condition. In this case, the condition of priority level 1 has only an image item for which the flag has been set before, so the condition of priority level 1 is completely satisfied. To the contrary, the condition of priority level 2 is not completely satisfied because no flag has been set for a page object item.

Processing in step S1307 is processing of advancing to the next object, and a currently processed object is regarded as a processed one. After that, the process returns to step S1303. In step S1303, no processed object is selected. If all the objects have been processed, it is determined in step S1303 that all the objects have been processed.

Processing in step S1308 is permitted operation obtaining processing. Conditions in each of which flags have been set for all items are extracted based on the flags set in step S1306. A condition having the highest priority is selected from the extracted conditions, and operations permitted by the selected condition are obtained.

Processing in step S1309 is the same as that in step S505 of FIG. 5. It is determined whether the permitted operations obtained in step S1308 include the operation received in step S1301. If the permitted operations include the received one (YES in step S1309), received operation execution processing in step S1310 is performed. If the permitted operations do not include the received one (NO in step S1309), the process ends.

As described above, when a plurality of objects overlap each other, an information processing apparatus 100 according to the fourth embodiment can determine a more complicated situation by setting a combination of conditions. By setting priority, no strict size condition need be set, and settings can be made easily.

(Fifth Embodiment)

Figure 14:
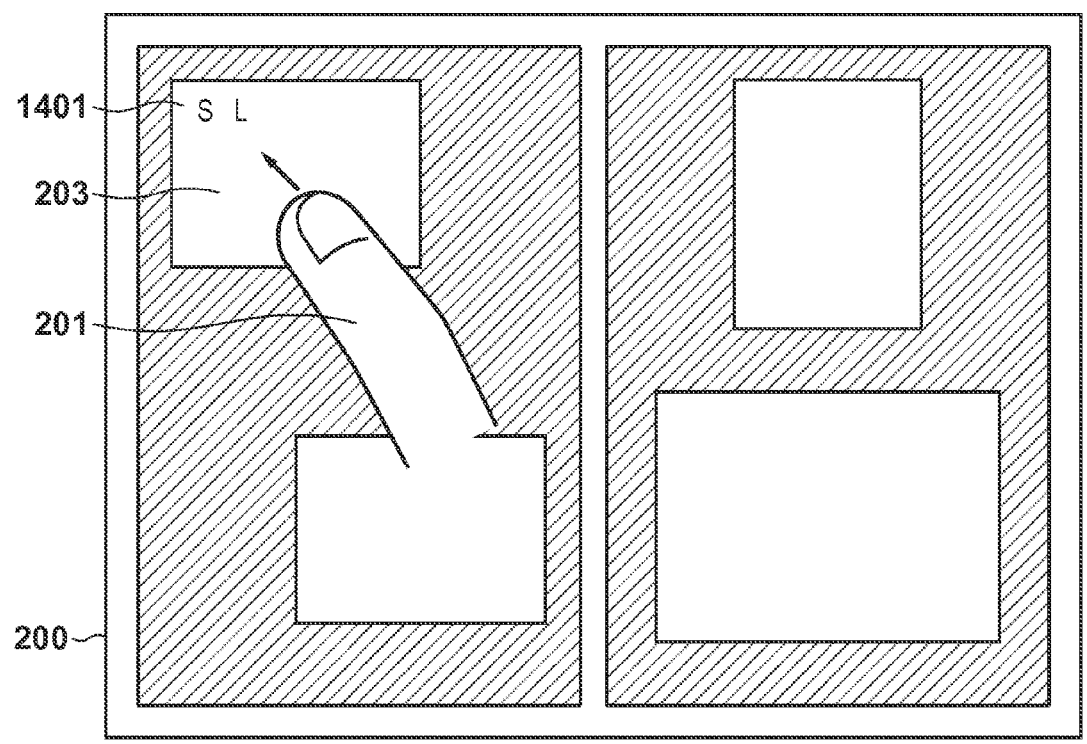
FIG. 14 is a view exemplifying an executable operation display.

In the fifth embodiment, an executable operation display will be exemplified with reference to FIG. 14. The example of FIG. 14 is basically the same as the display state of FIG. 11B.

A mark 1401 represents a currently accepted operation. In the example of FIG. 14, when a finger 201 comes close to an image 203, it is detected that the finger 201 has come close. Then, a permitted operation for the size of the image 203 is obtained, and a mark corresponding to the permitted operation is displayed on the image 203. As described above with reference to FIG. 11B, the image 203 accepts a selection operation and layout operation in the situation of FIG. 14. Hence, a mark "S" (SELECT) and a mark "L" (LAYOUT) are displayed. From this, the user can confirm operations currently accepted by the operation target object. Although the example of FIG. 14 uses a mark, operation names, operation explanations, and the like may be directly listed and displayed. A mark may be displayed not over an object but at a position where the mark does not overlap the object. An operation accepted at the current object size may always be displayed regardless of whether the finger has come close.

Figure 15A:
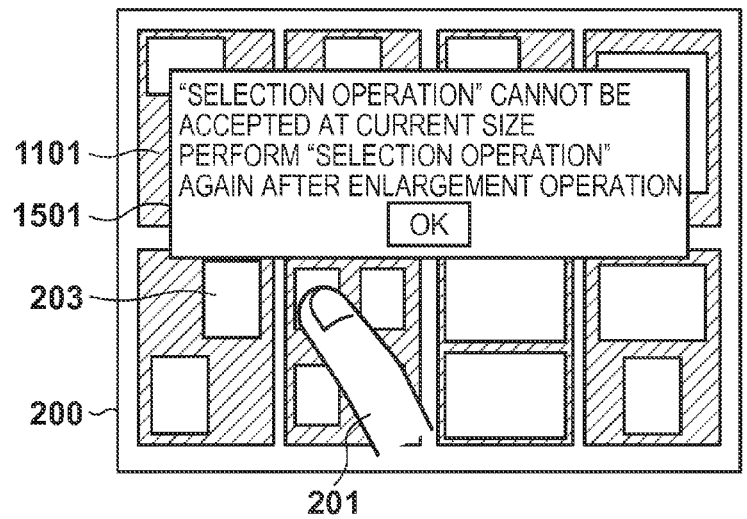
FIGS. 15A to 15C are views exemplifying a display representing that no input operation is executed.
Figure 15B:
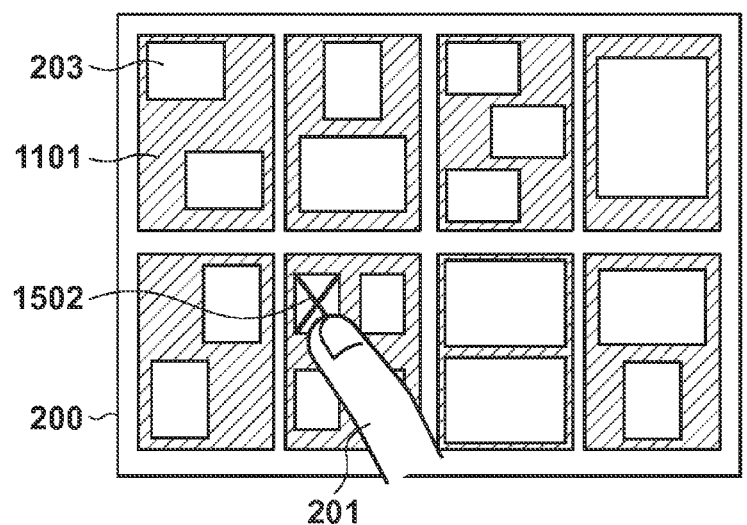
Figure 15C:
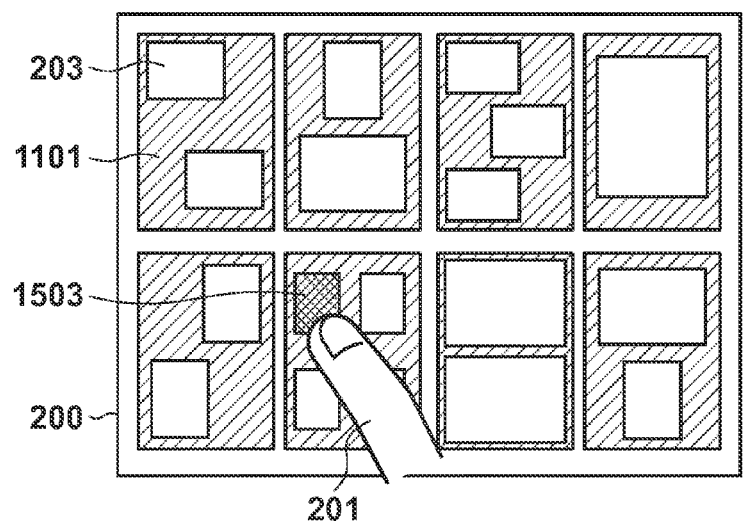

A display representing that no input operation is accepted will be exemplified with reference to FIGS. 15A to 15C. The example of FIGS. 15A to 15C is basically the same as the display state of FIG. 11A.

FIG. 15A shows an example of displaying a dialog to explicitly represent that no operation is accepted.

A dialog 1501 displays a determination result indicating that no selection operation can be accepted at the current size, and notifies the user of a message to this effect. The dialog 1501 is displayed because the user performs a selection operation for the image 203 with the finger 201 though the image 203 is displayed small and no image layout operation is accepted in the state of FIG. 15A. As shown in FIG. 15A, the dialog 1501 may further describe a message that a selection operation can be accepted if the image 203 is enlarged. Further, a display magnification which enables a selection operation may be described together.

FIG. 15B shows an example of displaying a mark on an object to explicitly represent that no operation is accepted.

An operation inhibition mark 1502 is a cross on an object to represent that an operation is inhibited at the current size. This means that the object cannot accept an operation by the user. Marks may be displayed on all objects which do not accept an operation.

FIG. 15C shows an example of faintly displaying an object to explicitly represent that no operation is accepted.

An operation inhibition object 1503 is displayed, for example, faintly to represent that the object cannot be operated at the current size. All objects which do not accept an operation may be displayed faintly.

As described above, an information processing apparatus 100 according to the fifth embodiment displays a currently running operation on the screen, and the user can recognize it before operation. This can reduce the inconvenience of failing to accept an operation though the user tries the operation. If the user performs an inhibited operation, a message that the operation cannot be accepted is displayed to notify him that the operation is inhibited. By describing an advice for accepting an operation, the user can be notified how to enable the operation.

(Sixth Embodiment)

In the sixth embodiment, a condition change screen will be exemplified with reference to FIG. 16A. The example of FIG. 16A assumes a screen which displays the condition table of FIG. 4 as a list to allow changing each item.

A list box 1601 allows selecting an object type. The user selects an operation target object type from the list.

A text box 1602 is used to input a size. The user inputs an object size serving as a determination condition when accepting an operation. The example of FIG. 16A assumes manual input in the text box. Instead, up and down buttons may be prepared for each digit to increment/decrement a value one by one. The user may select one of several values prepared in the list box.

A list box 1603 is used to select a permitted operation. The user selects an operation permitted when a condition is satisfied. Only one permitted operation can be set in the example of FIG. 16A, but a plurality of permitted operations may be set.

The list box and text box are used as display examples of each item, but the present invention is not limited to them. Each input item may be selected by a touch operation, or the cursor may be moved by a key operation. A database, text file, or the like which sets conditions may be directly edited without using a condition change screen as in the example of FIG. 16A.

An example of setting a condition value using a sample object are explained with reference to FIG. 16B. A sample object 1604 is created to adjust a condition value. Sample objects of various sizes are prepared, like the example of FIG. 16B. The user is prompted to input, to sample objects of all sizes, an operation to be adjusted such as a selection operation. At this time, a value in the condition table is changed to exclude, from conditions, a size at which the selection operation has failed. The operation fails when, for example, the finger is off an object or touches a plurality of objects in selection. In this fashion, when an operation fails, a value in the condition table can be adjusted to adjust the condition table suitably for the user who has input the operation. The adjustment precision is improved by inputting operations not only once but a plurality of number of times. A condition table corresponding to each situation may be created by adding conditions such as the finger, pen, and "during walking" and performing the same operation. Conditions may be learned from normal operations instead of preparing sample objects as in FIG. 16B. For example, when a selection operation is done for a small object, it is not accepted. However, when the same operation is performed by a predetermined number of times, it is determined that the user wants to perform a selection operation even at this size, and the condition may be changed to accept the selection operation. Even when an object is large enough for selection, but the user touches a portion other than the object or selects a plurality of objects and the operation fails, the condition may be changed not to accept the selection operation at this size. Also when the user cancels an immediately preceding operation, the condition may be changed not to accept the canceled operation.

Figure 17:
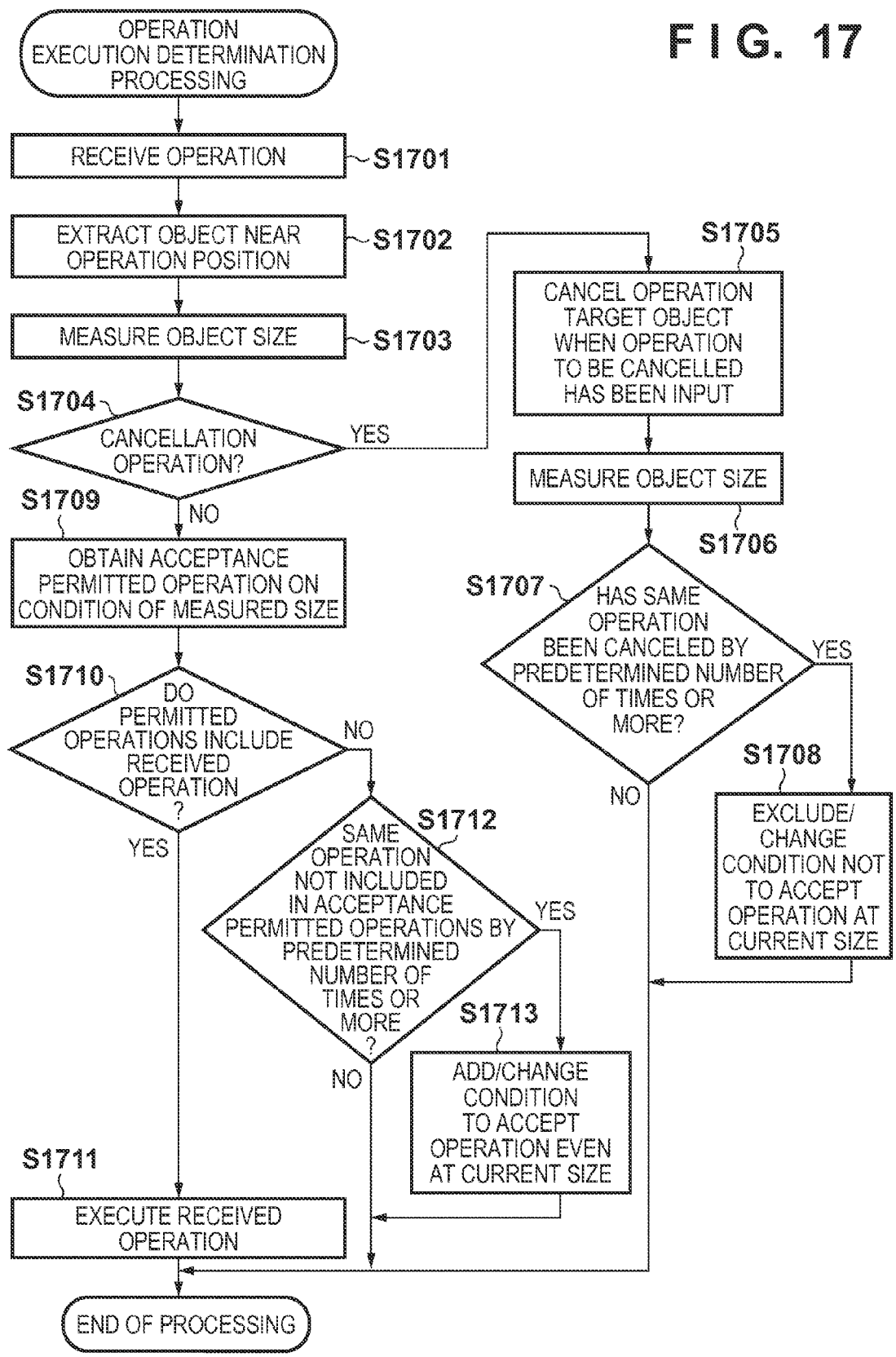
FIG. 17 is a flowchart exemplifying processing of changing a condition table by learning.

Processing of changing the condition table by learning from an operation failure and cancellation operation are explained with reference to FIG. 17. Processes in steps S1701 to S1703 are the same as those in steps S301 to S303 of FIG. 3. In these processes, an operation input by the user is received, an object near the position where the operation has been input is extracted, and the object size is measured.

In step S1704, it is determined whether the operation received in step S1701 is a cancellation operation. If it is determined that the received operation is a cancellation operation (YES in step S1704), the process advances to step S1705. If it is determined that the received operation is not a cancellation operation (NO in step S1704), the process advances to step S1709.

Processes in steps S1709 and S1710 are the same as those in steps S504 and S505 of FIG. 5. In step S1709, permitted operations are obtained based on the measured object size. In step S1710, it is determined whether the permitted operations include the received operation. If it is determined that the permitted operations include the received operation (YES in step S1710), the process advances to step S1711. In step S1711, processing corresponding to the received operation is executed. If it is determined that the permitted operations do not include the received operation (NO in step S1710), the process advances to step S1712.

In step S1712, it is determined whether the number of times by which it is determined in step S1710 that the permitted operations do not include the same operation as the received operation is equal to or larger than a predetermined number of times. If it is determined by the predetermined number of times that the same operation is "not accepted (not included in the permitted operations)" (YES in step S1712), the process advances to step S1713. In step S1713, the condition is changed to accept the operation even at the current size. This is because it can be interpreted that the user wants to perform the unaccepted operation even at the current size and thus has tried the operation over and over. In the processing of step S1713, an operation instruction to the object at the current display size is added as an executable operation instruction. As a size for permission, a size at which it was determined that an operation was inhibited is stored and changed to its average value, maximum value, or minimum value. If it is not determined by a predetermined number of times or more that the same operation is "not accepted (not included in the permitted operations)" (NO in step S1712), the process ends.

Processing in step S1705 is object obtaining processing, and an operation target object when a cancellation operation is input is obtained. Since the time when an input operation will be canceled is not known, an object at the position where the operation has been input is stored upon accepting any operation.

Processing in step S1706 is the same as that in step S303 of FIG. 3, and the size of the object obtained in step S1705 is measured. If any operation is accepted, the size of an object at the position where the operation has been input may be stored to obtain the value. In this case, the processing in step S1705 can be omitted.

In step S1707, it is determined whether the same operation has been canceled by a predetermined number of times. If the same operation has been canceled by the predetermined number of times or more (YES in step S1707), the process advances to step S1708. In step S1708, the condition is changed (excluded from executable operation instructions) not to accept the operation at the current size. This is because it can be interpreted that the user wants not to perform the operation at the current size and thus has canceled the operation many times. As a size for inhibition, a size at which an operation failed is stored and changed to its average value, maximum value, or minimum value.

As described above, an information processing apparatus 100 according to the sixth embodiment can change conditions to make settings suitable for the environment and the usage by the user. Learning an actually input operation, cancellation operation, and the like enables a more precise determination reflecting the user's habit and intention.

The present invention can prevent an operating error when the operation target object is displayed small, and execute an operation complying with the intention of the user who has enlarged/reduced the screen.

(Other Embodiments)

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (for example, computer-readable storage medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application Nos. 2010-232781 filed on Oct. 15, 2010 and 2011-120991, filed on May 30, 2011, which are hereby incorporated by reference herein in their entirety.

What is claimed is:

1. An information processing apparatus which accepts one of a plurality of processes of different types in accordance with an operation instruction issued on a display screen, comprising:
   at least one processor functioning as:
   an acceptance unit constructed to accept the operation instruction issued on the display screen;
   a display control unit constructed to display objects, which are displayable in a plurality of levels of display sizes, on the display screen in a display size which belongs to at least any one of the plurality of levels;
   an extraction unit constructed to extract an object of interest out of the objects displayed on the display screen based on a position where the operation instruction has been input on the display screen;
   an obtaining unit constructed to obtain information indicating the display size which is being displayed by said display control unit on the display screen when the object of interest is extracted by said extraction unit;
   a storing unit constructed to store in advance at least a plurality of combinations of information indicating a level of an object size and an executable operation instruction for each of a plurality of object types, wherein the executable operation corresponds to one of the plurality of processes of different types; and
   a determination unit constructed to determine executable processing corresponding to the information indicating a display size obtained by the obtaining unit out of the processes of different types based on the plurality of the combinations stored by the storing unit for the object type of the object of interest extracted by the extraction unit.

2. The apparatus according to claim 1, wherein when the display size is not larger than a threshold, said determination unit determines that processing corresponding to the operation instruction accepted by the acceptance unit cannot be executed, and when the display size is larger than the threshold, determines that the processing corresponding to the operation instruction accepted by the acceptance unit can be executed.

3. The apparatus according to claim 1, wherein the plurality of object types include at least a text box, and
   in a case where the object type of the object of interest extracted by the extraction unit is the text box,
   the determination unit determines, as the executable processing, a processing which scrolls the entire display screen when the display size of the text box is not larger than a threshold, and
   the determination unit determines, as the executable processing, a processing which selects a text box corresponding to the object of interest when the display size of the text box is larger than a threshold.

4. The apparatus according to claim 3, further comprising:
   an operation execution unit constructed to
   scroll the entire display screen in response to the acceptance unit accepting an operation of moving user's finger on the display screen in a case where the determination unit determines, as the executable processing, the processing which scrolls the entire display screen, and
   select a text box corresponding to the object of interest in response to the acceptance unit accepting a tap operation to the display screen in a case where the determination unit determines, as the executable processing, the processing which selects a text box corresponding to the object of interest.

5. The apparatus according to claim 1, wherein the plurality of object types include at least a text box, and in a case where the object type of the object of interest extracted by the extraction unit is the text box, the determination unit determines, as the executable processing, a processing which scrolls the entire display screen when the display size of the text box is not larger than a first threshold, the determination unit determines, as the executable processing, a processing which selects a text box corresponding to the object of interest when the display size of the text box is larger than the first threshold and not larger than a second threshold, and the determination unit determines, as the executable processing, a handwritten character input processing to a text box corresponding to the object of interest when the display size of the text box is larger than the second threshold.

6. The apparatus according to claim 5, further comprising:
an operation execution unit constructed to scroll the entire display screen in response to the acceptance unit accepting an operation of moving user's finger on the display screen in a case where the determination unit determines, as the executable processing, the processing which scrolls the entire display screen, select a text box corresponding to the object of interest in response to the acceptance unit accepting a tap operation to the display screen in a case where the determination unit determines, as the executable processing, the processing which selects a text box corresponding to the object of interest, and recognize a handwritten character which is input to a text box corresponding to the object of interest in response to the acceptance unit accepting an operation of moving user's finger on the display screen in a case where the determination unit determines, as the executable processing, the handwritten character input processing to a text box corresponding to the object of interest.

7. The apparatus according to claim 1, wherein the plurality of object types include at least an image, and in a case where the object type of the object of interest extracted by the extraction unit is the image, the determination unit determines, as the executable processing, a processing which scrolls the entire display screen when the display size of the image is not larger than a threshold, and the determination unit determines, as the executable processing, at least one of a processing which selects an image corresponding to the object of interest or a processing which moves an image corresponding to the object of interest, when the display size of the image is larger than the threshold.

8. The apparatus according to claim 7, further comprising:
an operation execution unit constructed to scroll the entire display screen in response to the acceptance unit accepting an operation of moving user's finger on the display screen in a case where the determination unit determines, as the executable processing, the processing which scrolls the entire display screen, and select a text box corresponding to the object of interest in response to the acceptance unit accepting a tap operation to the display screen, and move an image corresponding to the object of interest in response to the acceptance unit accepting an operation of moving user's finger on the display screen, in a case where the determination unit determines, as the executable processing, at least one of the processing which selects an image corresponding to the object of interest or the processing which moves an image corresponding to the object of interest.

9. The apparatus according to claim 1, wherein the determination unit determines the executable processing based on a priority order set to a combination of the object type of the object of interest and a determination condition of the display size, in a case where there are a plurality of superimposed objects at a position which the operation instruction is input to and a plurality of objects are extracted by the extraction unit.

10. The apparatus according to claim 1, further comprising a notification unit constructed to notify a user that the determination unit determines the operation instruction is not executable, in a case where the determination unit determines the operation instruction is not executable.

11. The apparatus according to claim 1, further comprising a condition changing unit constructed to change a determination condition of the display size, in a case where a number of times the determination unit has determined that it is not executable for the same operation instruction is not smaller than a predetermined number.

12. The apparatus according to claim 11, wherein the condition changing unit changes the determination condition in a case where undo operations are input more than a predetermined number for the same operation.

13. The apparatus according to claim 11, further comprising a shake detection unit constructed to detect a shake of a screen, wherein the condition changing unit changes the determination condition based on the amplitude of the shake.

14. The apparatus according to claim 1, wherein the obtaining unit obtains, as the information indicating the display size of the object of interest, a value indicating a size of a circumscribed rectangle of the object of interest.

15. The apparatus according to claim 1, wherein the obtaining unit obtains, as the information indicating the display size of the object of interest, a value indicating a magnification of a display size displayed on the display screen by the display control unit to a predetermined standard size for the object of interest, when the object of interest is extracted by the extraction unit.

16. The apparatus according to claim 1, wherein the obtaining unit obtains, as the information indicating the display size of the object of interest, a value indicating a display magnification of an entire image displayed on the display screen by the display control unit, when the object of interest is extracted by the extraction unit.

17. An information processing method in an information processing apparatus which accepts one of a plurality of processes of different types in accordance with an operation instruction issued on a display screen, comprising:

accepting the operation instruction issued on the display screen;

displaying objects, which are displayable in a plurality of levels of display sizes, on the display screen in a display size which belongs to at least any one of the plurality of levels;

extracting an object of interest out of the objects displayed on the display screen based on a position where the operation instruction has been input on the display screen;

obtaining information indicating the display size which is being displayed on the display screen when the object of interest is extracted;

storing in advance at least a plurality of combinations of information indicating a level of an object size and an executable operation instruction for each of a plurality of object types, wherein the executable operation corresponds to one of the plurality of processes of different types; and determining executable processing corresponding to the obtained information indicating a display size out of the processes of different types based on the plurality of the stored combinations for the object type of the extracted object of interest.

18. A computer-readable non-transitory storage medium storing a computer program for causing a computer to execute each step of an information processing method defined in claim 17.

19. An information processing apparatus which accepts one of a plurality of processes of different types in accordance with an operation instruction issued on a display screen, comprising:
   at least one processor functioning as:
   an acceptance unit constructed to accept the operation instruction issued on the display screen;
   an extraction unit constructed to extract an object of interest out of objects displayed on the display screen based on a position where the operation instruction has been input on the display screen;
   an obtaining unit constructed to obtain information indicating a display size of the object of interest extracted by said extraction unit;
   a storing unit constructed to store in advance at least a plurality of combinations of information indicating an object size and an executable operation instruction for each of a plurality of object types, wherein the executable operation corresponds to one of the plurality of processes of different types; and
   a determination unit constructed to determine executable processing corresponding to the information indicating a display size obtained by the obtaining unit out of the processes of different types based on the plurality of the combinations stored by the storing unit for the object type of the object of interest extracted by the extraction unit,
   wherein when the display size is not larger than a threshold, said determination unit determines whether the operation accepted by the acceptance unit is kept input,
   wherein when said determination unit determines that the operation accepted by the acceptance unit is kept input, said determination unit determines that the processing corresponding to the operation instruction accepted by the acceptance unit can be executed.

20. An information processing apparatus which accepts one of a plurality of processes of different types in accordance with an operation instruction issued on a display screen, comprising:
   at least one processor functioning as:
   an acceptance unit constructed to accept the operation instruction issued on the display screen;
   an extraction unit constructed to extract an object of interest out of objects displayed on the display screen based on a position where the operation instruction has been input on the display screen;
   an obtaining unit constructed to obtain information indicating a display size of the object of interest extracted by said extraction unit;
   a storing unit constructed to store in advance at least a plurality of combinations of information indicating an object size and an executable operation instruction for each of a plurality of object types, wherein the executable operation corresponds to one of the plurality of processes of different types; and
   a determination unit constructed to determine executable processing corresponding to the information indicating a display size obtained by the obtaining unit out of the processes of different types based on the plurality of the combinations stored by the storing unit for the object type of the object of interest extracted by the extraction unit,
   wherein the determination unit determines, as the executable processing, a gesture operation with more stroke counts or a gesture operation with more complicated shapes, as the display size of the object of interest becomes larger.

21. An information processing apparatus which accepts one of a plurality of processes of different types in accordance with an operation instruction issued on a display screen, comprising:
   at least one processor functioning as:
   an acceptance unit constructed to accept the operation instruction issued on the display screen;
   a display control unit constructed to display objects, which are displayable in a plurality of levels of display sizes, on the display screen in a display size which belongs to at least any one of the plurality of levels;
   an extraction unit constructed to extract an object of interest out of the objects displayed on the display screen based on a position where the operation instruction has been input on the display screen;
   an obtaining unit constructed to obtain information indicating the display size of the object of interest which is being displayed by said display control unit on the display screen when the object of interest is extracted by said extraction unit; and
   a determination unit constructed to determine, as executable processing in response to the operation instruction accepted by said acceptance unit, processing associated with a level that the display size indicated by information obtained by said obtaining unit belongs to, out of a plurality of types of processing associated as acceptable operations in case of being displayed at each display size of the plurality of levels, for a type of the object of interest extracted by said extraction unit.

22. An information processing method in an information processing apparatus which accepts one of a plurality of processes of different types in accordance with an operation instruction issued on a display screen, the method comprising:
   accepting the operation instruction issued on the display screen; displaying objects, which are displayable in a plurality of levels of display sizes, on the display screen in a display size which belongs to at least any one of the plurality of levels;
   extracting an object of interest out of the objects displayed on the display screen based on a position where the operation instruction has been input on the display screen;
   obtaining information indicating the display size of the object of interest which is being displayed on the display screen when the object of interest is extracted; and
   determining, as executable processing in response to the accepted operation instruction, processing associated with a level that the display size indicated by the obtained information belongs to, out of a plurality of types of processing associated as acceptable operations in case of being displayed at each display size of the plurality of levels, for a type of the extracted object of interest.

23. A non-transitory computer-readable storage medium storing a computer program for executing each step of an information processing method in an information processing apparatus which accepts one of a plurality of processes of different types in accordance with an operation instruction issued on a display screen, the method comprising:
- accepting the operation instruction issued on the display screen;
- displaying objects, which are displayable in a plurality of levels of display sizes, on the display screen in a display size which belongs to at least any one of the plurality of levels;
- extracting an object of interest out of the objects displayed on the display screen based on a position where the operation instruction has been input on the display screen;
- obtaining information indicating the display size of the object of interest which is being displayed on the display screen when the object of interest is extracted; and
- determining, as executable processing in response to the accepted operation instruction, processing associated with a level that the display size indicated by the obtained information belongs to, out of a plurality of types of processing associated as acceptable operations in case of being displayed at each display size of the plurality of levels, for a type of the extracted object of interest.

* * * * *